(12) United States Patent
Ahmadyan et al.

(10) Patent No.: US 11,770,551 B2
(45) Date of Patent: Sep. 26, 2023

(54) OBJECT POSE ESTIMATION AND TRACKING USING MACHINE LEARNING

(71) Applicant: Google LLC, Mountain View, CA (US)

(72) Inventors: Adel Ahmadyan, Mountain View, CA (US); Tingbo Hou, Santa Clara, CA (US); Jianing Wei, Cupertino, CA (US); Liangkai Zhang, Mountain View, CA (US); Artsiom Ablavatski, Mountain View, CA (US); Matthias Grundmann, San Jose, CA (US)

(73) Assignee: Google LLC, Mountain View, CA (US)

( * ) Notice: Subject to any disclaimer, the term of this patent is extended or adjusted under 35 U.S.C. 154(b) by 482 days.

(21) Appl. No.: 17/122,292

(22) Filed: Dec. 15, 2020

(65) Prior Publication Data

US 2022/0191542 A1    Jun. 16, 2022

(51) Int. Cl.
*G06V 10/00* (2022.01)
*H04N 19/54* (2014.01)
(Continued)

(52) U.S. Cl.
CPC ............. *H04N 19/54* (2014.11); *G06V 20/49* (2022.01); *H04N 19/105* (2014.11);
(Continued)

(58) Field of Classification Search
CPC ...... H04N 19/54; H04N 19/105; H04N 19/17; H04N 19/593; H04N 19/597; H04N 19/62;
(Continued)

(56) References Cited

U.S. PATENT DOCUMENTS

| 8,068,654 | B2* | 11/2011 | Barbu | G06V 10/774 |
| | | | | 382/154 |
| 9,135,502 | B2* | 9/2015 | Haker | G06T 19/20 |
| (Continued) |

OTHER PUBLICATIONS

Adel Ahmadyan, Tingbo Hou, Jianing Wei, Liangkai Zhang, Artsiom Ablavatski, and Matthias Grundmann, "Mediapipe Objectron," published Nov. 2020, https://google.github.io/mediapipe/solutions/objectron, 8 pages.

(Continued)

*Primary Examiner* — Amir Alavi
(74) *Attorney, Agent, or Firm* — McDonnell Boehnen Hulbert & Berghoff LLP

(57) ABSTRACT

A method includes receiving a video comprising images representing an object, and determining, using a machine learning model, based on a first image of the images, and for each respective vertex of vertices of a bounding volume for the object, first two-dimensional (2D) coordinates of the respective vertex. The method also includes tracking, from the first image to a second image of the images, a position of each respective vertex along a plane underlying the bounding volume, and determining, for each respective vertex, second 2D coordinates of the respective vertex based on the position of the respective vertex along the plane. The method further includes determining, for each respective vertex, (i) first three-dimensional (3D) coordinates of the respective vertex based on the first 2D coordinates and (ii) second 3D coordinates of the respective vertex based on the second 2D coordinates.

20 Claims, 10 Drawing Sheets

(51) Int. Cl.
  H04N 19/593 (2014.01)
  H04N 19/17 (2014.01)
  H04N 19/105 (2014.01)
  H04N 19/62 (2014.01)
  G06V 20/40 (2022.01)
(52) U.S. Cl.
  CPC ........... *H04N 19/17* (2014.11); *H04N 19/593* (2014.11); *H04N 19/62* (2014.11)
(58) Field of Classification Search
  CPC .......... G06N 3/08; G06N 3/045; G06N 3/454; G06N 3/02; G06V 10/82; G06V 20/64; G06V 20/49; G06V 20/647; G06T 7/248; G06T 2207/10016; G06T 2207/20081; G06T 2207/20084
  See application file for complete search history.

(56) References Cited

U.S. PATENT DOCUMENTS

| | | | | |
|---|---|---|---|---|
| 9,418,480 | B2* | 8/2016 | Issa | G06T 7/75 |
| 9,697,609 | B2* | 7/2017 | Kim | G06V 40/103 |
| 10,679,338 | B2* | 6/2020 | Gros | G06T 7/40 |
| 10,977,818 | B2* | 4/2021 | Clark | G06T 7/77 |
| 11,069,150 | B2* | 7/2021 | Sminchisescu | G06T 17/20 |
| 11,074,711 | B1* | 7/2021 | Akbas | G06V 10/454 |
| 11,074,717 | B2* | 7/2021 | Tremblay | G06N 3/08 |
| 11,625,838 | B1* | 4/2023 | Narapureddy | G06V 10/40 382/103 |
| 11,631,193 | B1* | 4/2023 | Akbas | G06V 10/764 382/103 |
| 2018/0365536 | A1* | 12/2018 | Wang | G06N 3/045 |

OTHER PUBLICATIONS

Adel Ahmadyan, Tingbo Hou, Jianing Wei, Liangkai Zhang, Artsiom Ablavatski, and Matthias Grundmann, "Announcing the Objectron Dataset," Google AI Blog, published Nov. 9, 2020, https://ai.googleblog.com/2020/11/announcing-objectron-dataset.html, 5 pages.

Adel Ahmadyan, Tingbo Hou, Jianing Wei, Liangkai Zhang, Artsiom Ablavatski, and Matthias Grundmann, "Instant 3D Object Tracking with Applications in Augmented Reality," published Jun. 23, 2020, https://arxiv.org/pdf/2006.13194.pdf, 4 pages.

Adel Ahmadyan, Tingbo Hou, Jianing Wei, Liangkai Zhang, Artsiom Ablavatski, and Matthias Grundmann, "Real-Time 3D Object Detection on Mobile Devices with MediaPipe," Google AI Blog, published Mar. 11, 2020, https://ai.googleblog.com/2020/03/real-time-3d-object-detection-on-mobile.html, 6 pages.

Baker et al., "Lucas-Kanade 20 Years On: A Unifying Framework," International Journal of Computer Vision, 2004, pp. 221-255, vol. 56, No. 3.

Benhimane et al., "Real-time image-based tracking of planes using Efficient Second-order Minimization," Proceedings of 2004 IEEE RSJ International Conference on Intelligent Robots and Systems, 2004, pp. 943-948, vol. 1.

Ding et al., "Object as distribution," published Jun. 25, 2019, https://arxiv.org/pdf/1907.12929.pdf, 10 pages.

Tingbo Hou, Adel Ahmadyan, Liangkai Zhang, Jianing Wei, and Matthias Grundmann, "MobilePose: Real-Time Pose Estimation for Unseen Objects with Weak Shape Supervision," Google Research, published Mar. 7, 2020, https://arxiv.org/pdf/2003.03522.pdf, 16 pages.

Hu et al., "Joint Monocular 3d Vehicle Detection and Tracking," Computer Vision Foundation, published Sep. 12, 2019, https://arxiv.org/pdf/1811.10742.pdf, 18 pages.

Lepetit et al., "EPnP: An accurate O(N) solution ot the PnP problem," International Journal of Computer Vision. 2009, pp. 155-166, vol. 81, No. 2.

Li et al., "Stereo vision-based semantic 3D object and ego-motion tracking for autonomous driving," published Nov. 29, 2018, https://arxiv.org/pdf/1807.02062.pdf, 16 pages.

Liang et al., "Planar object tracking in the wild: A Benchmark," published May 22, 2018, https://arxiv.org/pdf/1703.07938.pdf, 8 pages.

Ošep et al., "Combined Image- and World-Space Tracking in Traffic Scenes," published Sep. 19, 2018, https://arxiv.org/pdf/1809.07357.pdf, 8 pages.

Pirchheim et al., "Homography-Based Planar Mapping and Tracking for Mobile Phones," International Symposium on Mixed and Augmented Reality, IEEE 2011, pp. 27-36, published Oct. 2011, https://www.researchgate.net/profile/Gerhard_Reitmayr/publication/221221458_Homography-based_planar_mapping_and_tracking_for_mobile_phones/links/0fcfd50b7c1c7d27ce000000/Homography-based-planar-mapping-and-tracking-for-mobile-phones.pdf.

Prince et al., "Augmented Reality Camera Tracking with Homographies," Computer Graphics and Applications, IEEE, published Nov. 2002, pp. 39-45, vol. 22, No. 6.

Sandler et al., "Mobilenetv2: Inverted residuals and linear bottlenecks," 2018, published Mar. 21, 2019, https://arxiv.org/pdf/1801.04381.pdf, 14 pages.

Sharma et al., "Beyond Pixels: Leveraging Geometry and Shape Cues for Online Multi-Object Tracking," published Jul. 27, 2018, https://arxiv.org/pdf/1802.09298.pdf, 8 pages.

Wei et al., "Instant Motion Tracking and Its Applications to Augmented Reality," published Jul. 16, 2019, https://arxiv.org/pdf/1907.06796.pdf, 4 pages.

Weng et al., "A Baseline for 3D Multi-Object Tracking," published Jul. 9, 2019, https://www.researchgate.net/publication/334361155_A_Baseline_for_3D_Multi-Object_Tracking, 11 pages.

Wikipedia, "Perspective-n-Point," https://en.wikipedia.org/wiki/Perspective-n-Point, 2021, 5 pages.

Zhou et al., "Tracking Objects as Points," published Aug. 21, 2020, https://arxiv.org/pdf/2004.01177.pdf, 22 pages.

Hou et al., U.S. Appl. No. 16/988,683, filed Aug. 9, 2020.

* cited by examiner

OBJECT POSE ESTIMATION AND TRACKING USING MACHINE LEARNING

BACKGROUND

It may be beneficial to detect the presence, location, and/or orientation of objects in an environment. For example, this information could be used to control a robot or other device to interact with the object (e.g., to pick up the object, to perform a process on the object, to pack the object, and/or to reorient the object). In another example, this information could be used to provide an overlay image of the object, for example, as part of an augmented reality system. In another example, object detection can help with inventory control, identifying the contents of an environment, navigating an environment, and/or other tasks.

SUMMARY

A machine learning model may be configured to detect, within a first image of a video, a first two-dimensional representation of a bounding volume for an object represented in the video. A tracker may be used to track the first two-dimensional representation of the bounding box across images of the video. Thus, the tracker may determine, within a second image of the video, a second two-dimensional representation of the bounding box. The second two-dimensional representation may be determined without processing of the second image by the machine learning model, and may instead be based on a transformation between the first and second image determined based on positions of corresponding features within the first and second images and/or inertial sensor data, among other possibilities. The tracker may be configured to track the representation of the bounding volume along a plane associated with the bounding volume. The first and second two-dimensional representations of the bounding volume may be used, along with camera parameters, to determine a first and a second three-dimensional representation of the bounding volume. The representations of the bounding volume may be displayed within the video and/or a three-dimensional model based thereon to visually illustrate the bounding volume.

In a first example embodiment, a computer-implemented method may include receiving a video that includes a plurality of images representing an object. The computer-implemented method may also include determining, using a machine learning model, based on a first image of the plurality of images, and for each respective vertex of a plurality of vertices of a bounding volume for the object, first corresponding two-dimensional coordinates of the respective vertex within the first image. The computer-implemented method may additionally include tracking, from the first image to a second image of the plurality of images, a position of each respective vertex along a plane underlying the bounding volume. The computer-implemented method may further include determining, for each respective vertex, second corresponding two-dimensional coordinates of the respective vertex within the second image based on the position of the respective vertex along the plane and independently of processing of the second image by the machine learning model. The computer-implemented method may yet further include determining, for each respective vertex, (i) first corresponding three-dimensional coordinates of the respective vertex, as represented in the first image, based on the first corresponding two-dimensional coordinates and (ii) corresponding second three-dimensional coordinates of the respective vertex, as represented in the second image, based on the second corresponding two-dimensional coordinates.

In a second example embodiment, a system may include a processor and a non-transitory computer-readable medium having stored thereon instructions that, when executed by the processor, cause the processor to perform operations. The operations may include receiving a video that includes a plurality of images representing an object. The operations may also include determining, using a machine learning model, based on a first image of the plurality of images, and for each respective vertex of a plurality of vertices of a bounding volume for the object, first corresponding two-dimensional coordinates of the respective vertex within the first image. The operations may additionally include tracking, from the first image to a second image of the plurality of images, a position of each respective vertex along a plane underlying the bounding volume. The operations may further include determining, for each respective vertex, second corresponding two-dimensional coordinates of the respective vertex within the second image based on the position of the respective vertex along the plane and independently of processing of the second image by the machine learning model. The operations may yet further include determining, for each respective vertex, (i) first corresponding three-dimensional coordinates of the respective vertex, as represented in the first image, based on the first corresponding two-dimensional coordinates and (ii) corresponding second three-dimensional coordinates of the respective vertex, as represented in the second image, based on the second corresponding two-dimensional coordinates.

In a third example embodiment, an article of manufacture, including a non-transitory computer-readable medium, may have stored thereon program instructions that, upon execution by a computing system, cause the computing system to perform operations. The operations may include receiving a video that includes a plurality of images representing an object. The operations may also include determining, using a machine learning model, based on a first image of the plurality of images, and for each respective vertex of a plurality of vertices of a bounding volume for the object, first corresponding two-dimensional coordinates of the respective vertex within the first image. The operations may additionally include tracking, from the first image to a second image of the plurality of images, a position of each respective vertex along a plane underlying the bounding volume. The operations may further include determining, for each respective vertex, second corresponding two-dimensional coordinates of the respective vertex within the second image based on the position of the respective vertex along the plane and independently of processing of the second image by the machine learning model. The operations may yet further include determining, for each respective vertex, (i) first corresponding three-dimensional coordinates of the respective vertex, as represented in the first image, based on the first corresponding two-dimensional coordinates and (ii) corresponding second three-dimensional coordinates of the respective vertex, as represented in the second image, based on the second corresponding two-dimensional coordinates.

In a fourth example embodiment, a system may include means for receiving a video that includes a plurality of images representing an object. The system may also include means for determining, using a machine learning model, based on a first image of the plurality of images, and for each respective vertex of a plurality of vertices of a bounding volume for the object, first corresponding two-dimensional coordinates of the respective vertex within the first image. The system may additionally include means for tracking, from the first image to a second image of the plurality of images, a position of each respective vertex along a plane underlying the bounding volume. The system may further include means for determining, for each respective vertex, second corresponding two-dimensional coordinates of the respective vertex within the second image based on the position of the respective vertex along the plane and independently of processing of the second image by the machine learning model. The system may yet further include means for determining, for each respective vertex, (i) first corresponding three-dimensional coordinates of the respective vertex, as represented in the first image, based on the first corresponding two-dimensional coordinates and (ii) corresponding second three-dimensional coordinates of the respective vertex, as represented in the second image, based on the second corresponding two-dimensional coordinates.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
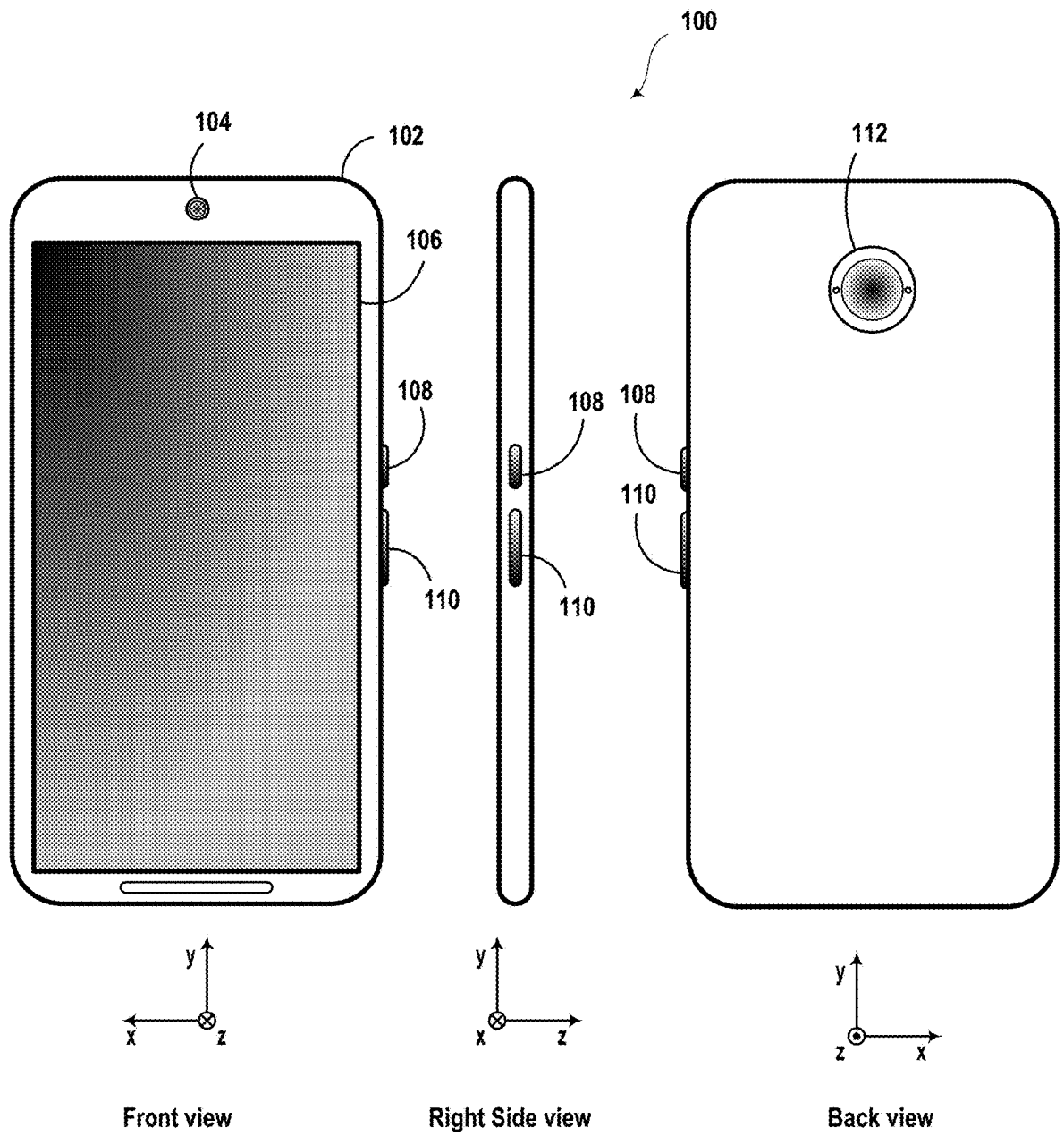
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

A machine learning model may be configured to determine, based on an image of an object, a two-dimensional representation of a bounding volume of the object. The bounding volume may be defined by a predetermined number of points interconnected according to a predetermined pattern. For example, the bounding volume may be a rectangular prism, and the two-dimensional representation thereof may include two-dimensional coordinates of vertices (e.g., 8 corners) of the rectangular prism. The bounding volume may be indicative of a pose of the object within the scene. Specifically, each vertex may be uniquely identifiable such that the relative positions of the vertices define a pose of the bounding volume and thus the pose of the object.

In some cases, the machine learning model may be configured to detect two-dimensional representations of the object within a video by processing each image of the video. Such processing of the images of the video may, however, be undesirable for at least two reasons. First, in order to operate in substantially real-time (e.g., at a rate equal to or greater than a frame rate of the video), a size of the machine learning model (e.g., number of parameters defining the model) may be reduced. A reduction in size may be associated with a reduction in the accuracy of the determination of the two-dimensional representation of the bounding volume. The reduction in accuracy may be particularly prominent, for example, when the reduction in size is sufficient to allow the machine learning model to be executed by mobile computing devices and/or other computationally-limited devices. Second, the generation, using the machine learning model, of a new two-dimensional representation of the bounding volume for each image in the video may induce jitter, or visually-apparent shaking, of the bounding volume across images. For example, due to differences in how each image represents the object, the machine learning model may generate two-dimensional representations of the bounding volume that differ slightly from one another and thus appear to move relative to the object.

Accordingly, the machine learning model may be used in combination with a tracker configured to track a two-dimensional representation of the bounding volume generated by the machine learning model across two or more images of the video. Thus, rather than determining a new two-dimensional representation for each image in the video (or for more than a threshold number of frames in the video) using the machine learning model, the machine learning model may be used to determine a respective two-dimensional representation of the bounding volume based on a subset of the images of the video. Respective two-dimensional representations of the bounding volume may be determined for the other images (unprocessed by the machine learning model) of the video by tracking, across images, the two-dimensional representations generated by the machine learning model.

The tracker may allow for an increase in the number of parameters of the machine learning model, and thus the accuracy of its outputs. Specifically, tracking may allow the machine learning model to process images at a rate that is smaller than a frame rate of the video while still appearing to operate in real-time. The tracker may be less computationally expensive than the machine learning model, and may thus operate at frame rates that exceed the frame rate of the video, thereby making up the difference between the processing rate of the machine learning model and the video frame rate. For example, a tracking result for a given frame may be available before a detection result for the given frame is available. Thus, in order to maintain the appearance of real-time performance, the tracking result may be used for the given frame, while the detection result for the given frame may be tracked to a subsequent frame, and used to provide the two-dimensional representation of the bounding volume for the subsequent frame.

Additionally, the tracker may reduce the amount of apparent jitter by determining two-dimensional representations of the bounding volume that are consistent with a perspective change between images, and thus appear to remain in a constant pose relative to the corresponding object. Further, in some cases, when a new two-dimensional representation of the bounding volume is determined by the machine learning model, it may be combined with, rather than completely replace, a two-dimensional representation tracked from a preceding image, thus further smoothing out the apparent positional changes of the bounding volume relative to the corresponding object.

The tracker may be configured to determine a transform between a first image and a second image by tracking a position of a plurality of regions between the first image and the second image and/or determining camera motion between the first image and the second image. The camera motion may be based on apparent motion of the one or more regions of the plurality of regions and/or inertial sensor data generated by one or more inertial sensors on a camera device that generated the video. Specifically, the tracker may determine a plane underlying the bounding volume, and may determine the transform such that the two-dimensional representation remains within the plane. The tracker may apply the transform to a first two-dimensional representation of the bounding volume in the first image to obtain a second two-dimensional representation of the bounding volume in the second image.

Each respective two-dimensional representation of the bounding volume may be overlaid on top of its corresponding image to visually illustrate the bounding volume within the corresponding image. Additionally, each respective two-dimensional representation of the bounding volume may be projected into three-dimensional space to generate a corresponding three-dimensional representation of the bounding volume. Each respective three-dimensional representation of the bounding volume may be displayed as part of a three-dimensional model associated with the video to visually illustrate the bounding volume within the three-dimensional model. Additionally or alternatively, the two-dimensional representation of the bounding volume and/or the three-dimensional representation of the bounding volume may be used by a robotic device to manipulate the object, navigate with respect to the object, and/or otherwise operate based on the pose of the object.

II. Example Computing Devices and Systems

FIG. 1 illustrates an example computing device 100. Computing device 100 is shown in the form factor of a mobile phone. However, computing device 100 may be alternatively implemented as a laptop computer, a tablet computer, or a wearable computing device (e.g., a watch), among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of any aspect of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

Figure 2:
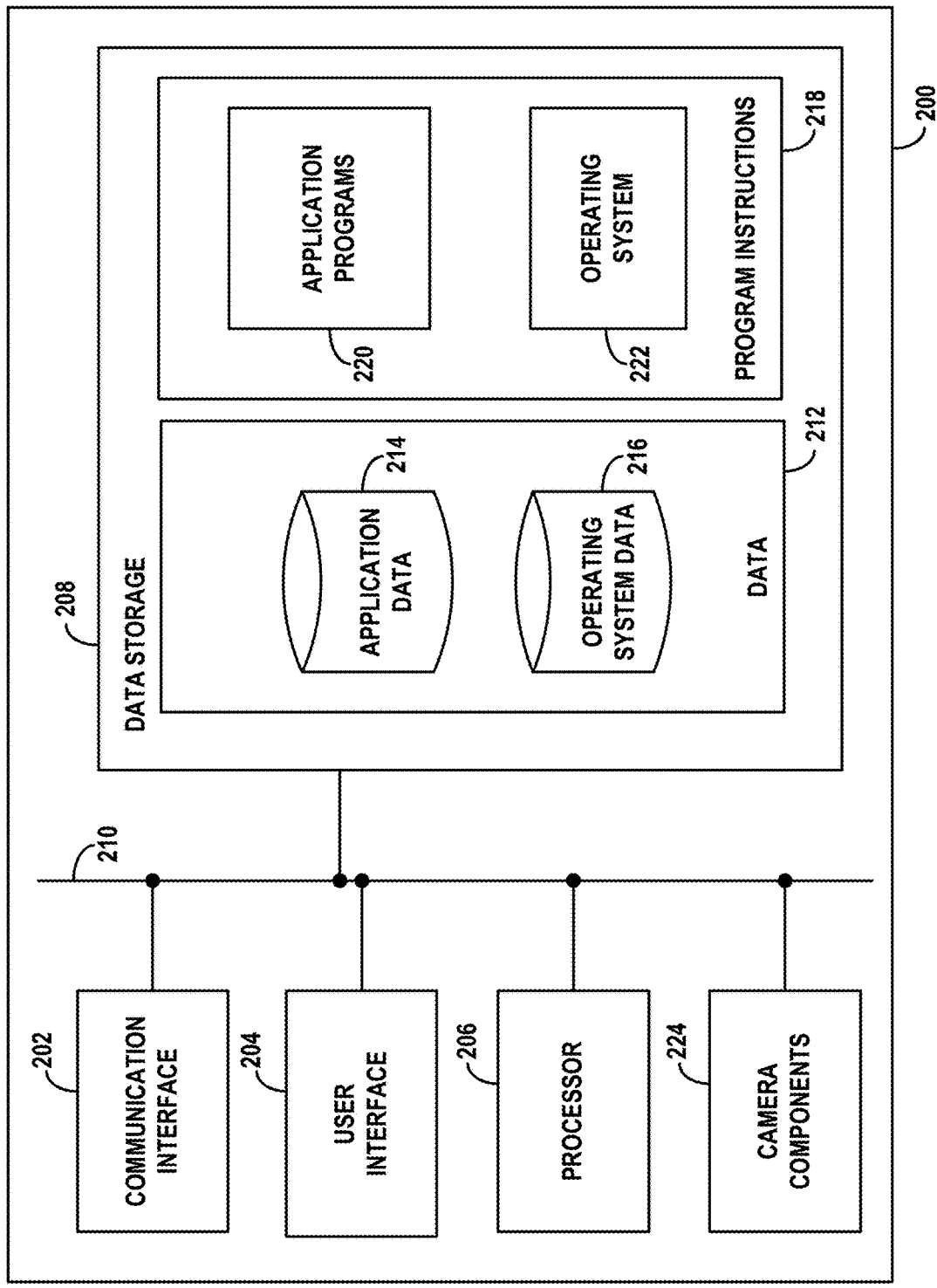
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example Object Pose Estimation Operations and Models

Figure 3B:
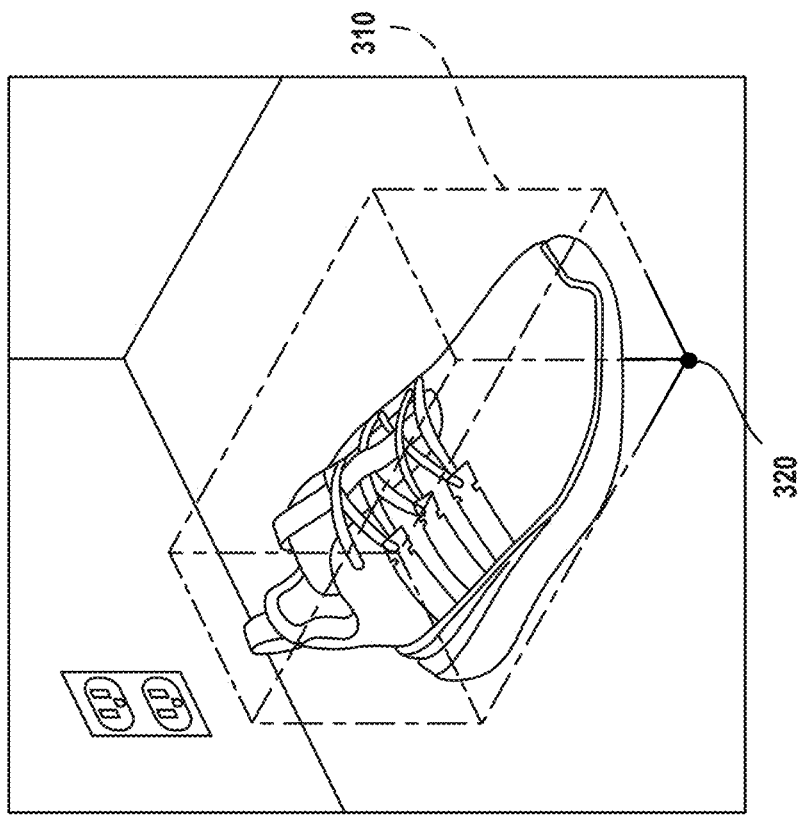
FIG. 3B illustrates the image of FIG. 3A with a bounding volume superimposed thereon, in accordance with examples described herein.
Figure 3A:
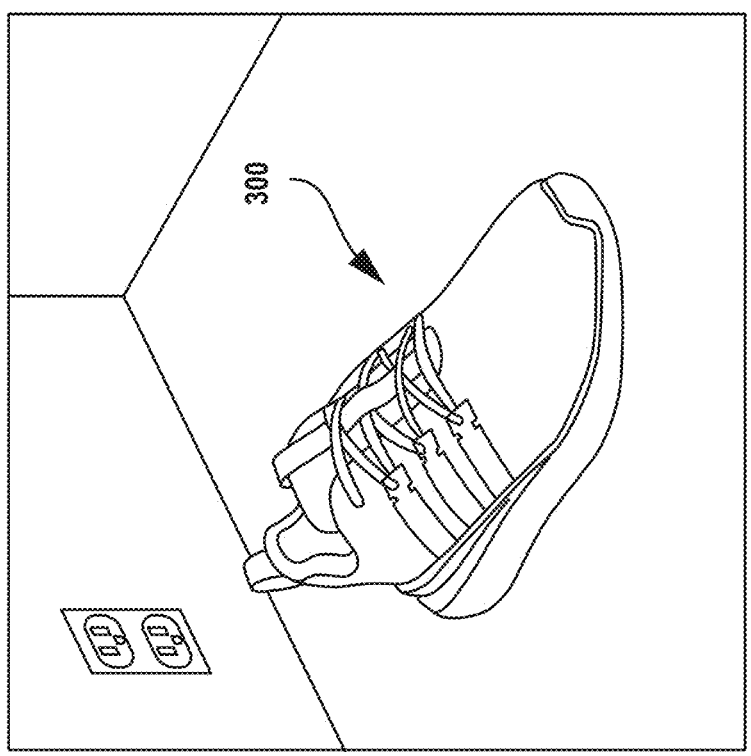
FIG. 3A illustrates an image of a scene, in accordance with examples described herein.

FIG. 3A illustrates an example image that depicts a scene containing target object 300 (a shoe). The embodiments described herein can be applied to determine and track, based on one or more such images, information about the pose of such a target object within the scene and/or within the image. For example, vertices of a bounding volume that contains target object 300 could be determined from the image.

The result of such a determination is shown in FIG. 3B, which shows the example image with bounding box 310 superimposed thereon. Bounding box 310 is defined by eight vertices (including example vertex 320). The vertices may be specified using two-dimensional (2D) coordinates in the space of the image, using 3D coordinates in a camera reference frame and/or a world reference frame, or according to some other convention.

Detecting the presence, location, and/or orientation of objects (e.g., determining the location of vertices of the bounding box 310 for object 300) based on an image of a scene containing the object(s) can be difficult and computationally expensive. This may be especially so when the object is an "unseen" object, that is, an object that was not individually and explicitly represented in a set of training images or other training data used to train a machine learning model (e.g., an artificial neural network (ANN)) used to convert images into bounding volume vertices or other pose information.

A variety of embodiments are provided herein to apply machine learning models to generate, and subsequently track, such pose information from images of scenes that contain one or more objects of interest. These embodiments are computationally compact, allowing for computation in substantially real-time and/or with relatively little to no delay on smartphones or other computationally-limited devices. These embodiments can thus facilitate applications in augmented reality (AR) or other mobile object detection and pose estimation applications. The objects may or might not be represented in the corpus of training data used to train the machine learning models. Embodiments herein also facilitate the training of such machine learning models and to generate training data for such training processes. These embodiments allow for the determination and tracking of pose data from images in a manner that may be improved, relative to previously existing methods, with respect to speed of the determination, computational cost of the determination, and/or the accuracy of the determination, e.g., in situations where the object was not, itself, explicitly represented in the set of training images available when the machine learning model was trained.

Various embodiments provided herein include an ANN (which may be composed of multiple constituent sub-networks) that receives an image of a scene as input and that outputs a heat map, and a plurality of displacement maps, which may include one or more first-axis displacement maps and one or more second-axis displacement maps. The heat map includes at least one peak or other feature whose location is indicative of the location of a target object within the image. If the image contains multiple objects, the heat map can include multiple peaks (or other features). The location of a peak within the heat map may then be used to determine the location, within the reference frame of the image, of one or more key points (e.g., vertices of a bounding volume) that are related to the pose of the target object. This can include, for a particular vertex of a bounding box, using the location of the target object determined from the heat map to determine a first-axis displacement and a second axis displacement for the target object based on a first-axis displacement map and a second axis displacement map for the particular vertex, respectively. The location of the particular vertex is the location of the target object offset in the first axis direction by the first-axis displacement amount and offset in the second axis direction by the second-axis displacement amount.

Such a method may be augmented by using a first sub-network of the ANN to generate, based on the input image, shape information for the target object. This shape information is then used, in combination with the input image, to generate the heat map and displacement maps. The predicted shape information can include a segmentation map, one or more coordinate maps indicative of the location (e.g., the three-dimensional location) of observable portions of the target object, information about the presence, location, or other property of features of the target object, or other information about the location, extent, shape, or other information about the shape of the target object.

Note that ANNs (e.g., ANNs that include convolutional neural networks or other neural network structures) are used throughout this disclosure as a non-limiting example of a type of machine learning model or algorithm that can be trained, using the methods described herein, to predict bounding volume vertex locations or other pose information for a seen or unseen target object based on an image of a scene that includes a representation of the target object. The methods described herein can be modified to use regression trees, support vector machines, or other machine learning models in addition to or as an alternative to ANNs.

Embodiments provided herein can be used to train one or more ANNs or other machine learning algorithms or models to generate, from input images, heat maps and displacement maps that can then be used to determine the location, within the image, of vertices of a bounding volume (or some other key point related pose) for an object that is present in the image. The displacement maps are organized in corresponding sets to provide two (or more) dimensions of displacement information for each vertex of the bounding volume. Thus, to specify the location of eight bounding volume vertices in the two dimensions of the image frame (e.g., horizontal and vertical or some other first and second directions relative to the image frame), the ANN will output sixteen displacement maps in addition to the heat map used to determine a representative location (e.g., a centroid) for the object that is then used to determine, from the displacement maps, displacements from the representative location for each of the vertices.

Figure 4A:
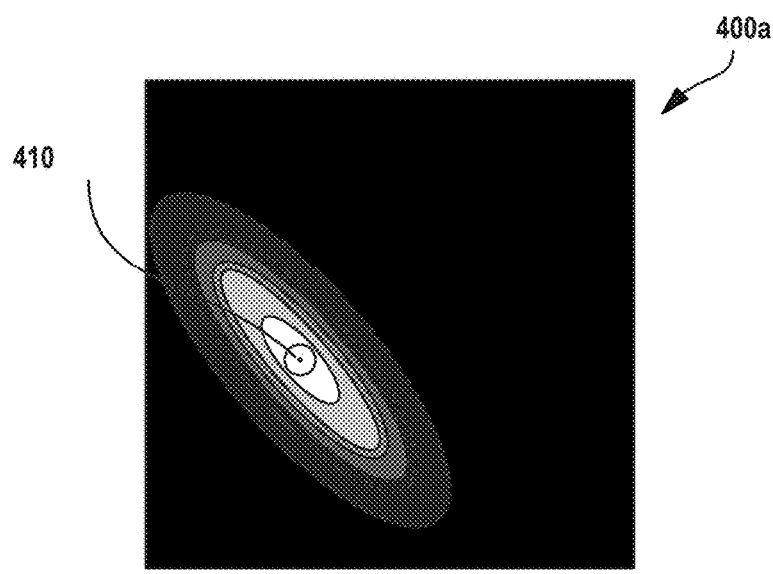
FIG. 4A illustrates a heat map, in accordance with examples described herein.

FIG. 4A depicts an example heat map 400a that could be generated, by a machine learning model, from the image of FIG. 3A. Heat map 400a includes a peak (indicated by the lighter-color regions) that corresponds to location 410 (e.g., to a centroid or other representative location) of object 300 in the image. Location 410 can be determined from heat map 400a in a variety of ways. For example, location 410 could be determined by detecting a local maximum in heat map 400a, by performing template matching on heat map 400a, by performing a maximum likelihood or other type of fit of a bivariate Gaussian or other bivariate distribution onto heat map 400a, and/or by performing some other process to determine location 410 of object 300 within the input image.

The determined location of an object can then be used to determine, from a set of displacement maps, the locations of vertices of a bounding volume or other set of key points relating to the location, orientation, and/or other pose information for the object. This can include using the location determined from the heat map to extract, from two or more displacement maps that correspond to a particular vertex, respective displacements of the particular vertex from the determined location in first and second dimensions (e.g., horizontal and vertical dimension) within the image.

Figures 4B, 4C:
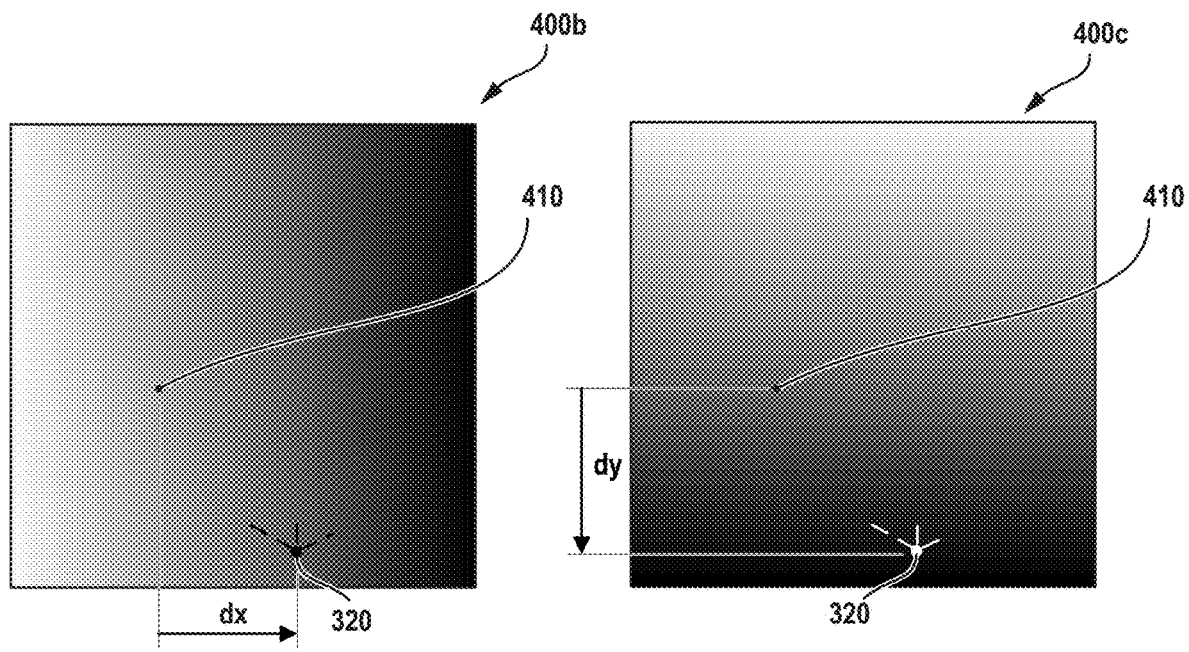
FIGS. 4B and 4C illustrate displacement maps, in accordance with examples described herein.

FIG. 4B depicts a first-axis displacement map 400b that includes a plurality of first-axis displacements along a first axis (horizontal axis) in the image of FIG. 3A. FIG. 4C depicts a second-axis displacement map 400c that includes a plurality of second-axis displacements along a second axis (vertical axis) in the image of FIG. 3A. First-axis displacement map 400b and second-axis displacement map 400c correspond to vertex 320 of bounding box 310. Additional pairs of displacement maps, each pair including a respective first-axis map and second-axis map, can be determined for each of the additional vertices of bounding box 310.

A first-axis displacement, $d_x$, is determined based on one or more first-axis displacement values of first-axis displacement map 400b that correspond to location 410 determined from heat map 400a. This could include selecting a single one of the first-axis displacement values from first-axis displacement map 400b, determining a weighted or uniform average of a set of displacement values from first-axis displacement map 400b that are within a threshold distance from and/or most proximate to location 410, and/or using some other method to determine the first-axis displacement $d_x$ for vertex 320. The location, along the first axis, of vertex 320 is then determined by adding (or subtracting) the determined first-axis displacement $d_x$ from the first-axis coordinate of location 410.

A second-axis displacement, $d_y$, is determined based on one or more second-axis displacement values of second-axis displacement map 400c that correspond to location 410 determined from heat map 400a. This could include selecting a single one of the second-axis displacement values from second-axis displacement map 400c, determining a weighted or uniform average of a set of displacement values from second-axis displacement map 400c that are within a threshold distance from and/or most proximate to location 410, and/or using some other method to determine the second-axis displacement $d_y$ for vertex 320. The location, along the second axis, of vertex 320 is then determined by adding (or subtracting) the determined second-axis displacement $d_y$ from the second-axis coordinate of location 410.

The location and vertices (or other key points) for additional objects in an image can be determined in a similar manner. This can be done by detecting multiple peaks (or other features) in the heat map and then determining respective locations therefor based on the heat map. Detection of multiple peaks may include applying a maximum likelihood method or some other statistical and/or machine learning-based method to determine how many peaks are represented in the heat map and/or to determine how many objects are represented in an input image.

Once the vertices of a bounding volume (or some other key points related to the pose of one or more objects in an image) are determined in the above manner, additional determinations may be performed. In some examples, this could include modifying or otherwise filtering the determined vertices (or other key points) to improve them in some manner. For example, where the determined vertices are vertices of a bounding volume that is an orthogonal prism (i.e., a cuboid having adjacent faces that are orthogonal to each other, and opposite faces that are parallel to each other), the locations of the determined vertices could be modified such that the vertices correspond to the vertices of such an orthogonal prism. In some examples, the size, shape, orientation, location, or other pose information about the object within the scene could be determined from the locations of the vertices. Such a determination could be analytical (e.g., based on mathematical transforms or other heuristics relating vertex locations to location, orientation, or other pose information) and/or based on the output of a machine learning model provided with the vertex locations as inputs.

An ANN or other machine learning model or algorithm could be configured and trained to provide such a heat map and displacement maps from input images. Such an ANN could be and/or include one or more convolutional neural networks (CNN) or ANN structures configured to receive images or other high-input-number 2D inputs and to process such inputs in a location-aware manner (e.g., by applying input kernels or other two- or more-dimensional filters to an input of the network and/or to intermediate variables of the network). Such an ANN could include a base network that provides outputs to two or more 'heads,' each of the heads including a respective ANN that receives inputs from the base network and that generates one or more respective outputs. For example, a first head of such a composite ANN could generate the heat map 400a while a second head could generate one or more displacement maps (e.g., one or both of the first-axis displacement map 400b or the second-axis displacement map 400c).

Figure 5:
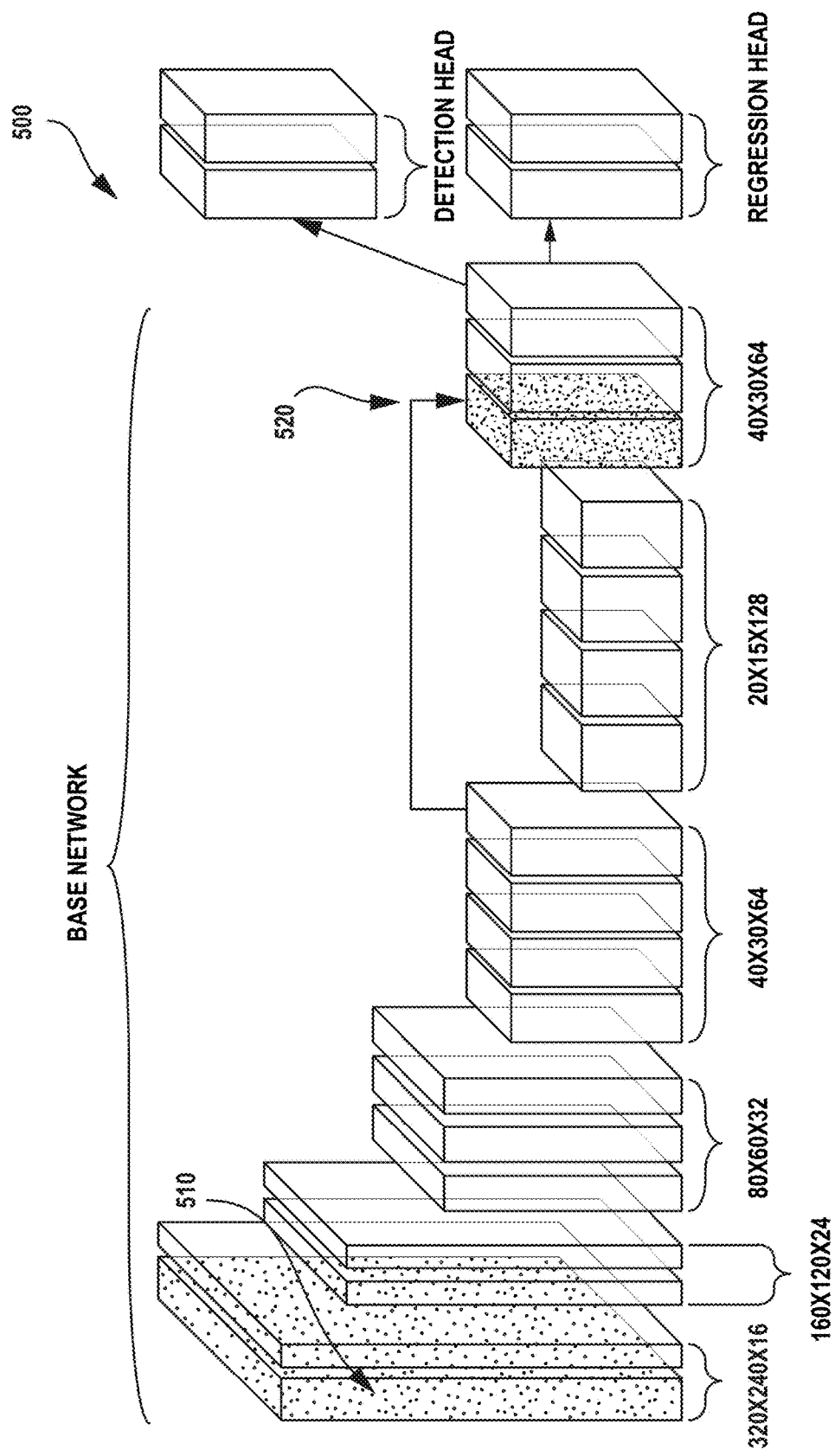
FIG. 5 illustrates a machine learning model, in accordance with examples described herein.

FIG. 5 depicts aspects of such an ANN 500, which includes a base ANN ("base network"), a first 'head' ANN configured to output a heat map ("detection head"), and a second 'head' ANN configured to generate two or more displacement maps ("regression head"). The layers (or blocks) of ANN 500 are depicted as rectangular prisms, with the dimension of the blocks in a set of layers indicated below the set of layers ("number of units in first dimension"×"number of units in second dimension"×"number of channels"). A first layer 510 is a convolutional layer and a second layer 520 is a deconvolutional layer. The remaining layers may be inverted residual blocks.

ANN 500 is arranged according to an "expansion-and-squeeze" scheme, with a shortcut connection (indicated by an arrow) running parallel to a thin bottleneck in the middle of ANN 500 (the four 20×15×128 layers). The input is an image of size 640×480×3 (three channels of a color image). The output of the detection head is a 40×30×1 heat map and the output of the regression head is a 40×30×16 tensor (a first-axis displacement map and a second-axis displacement map for each one of eight different bounding box vertices). ANN 500 could be a version of an available model of ANN, e.g., MobileNetv2.

ANN 500 is intended as a non-limiting example of an ANN to which an input image can be applied to generate heat maps, displacement maps, and/or other outputs as described herein. Alternatively configured ANNs (e.g., having different numbers and/or configurations of layers and connections therebetween) or other machine learning models or algorithms could be applied as described elsewhere herein.

An ANN (e.g., ANN 500) can be trained in a variety of ways, using a variety of types of training data, to generate the outputs described herein from an input image. Training images could be manually annotated by humans drawing bounding volumes on images that include objects of interest (e.g., different instances of objects that are of the same object type, e.g., different shoes). This manual annotation could be improved by prompting human annotators to iteratively improve the annotation of videos of objects that include camera motion data. This camera motion data can be used to update, based on corrective user input, the bounding volume that is overlaid over the object in each frame of the video. The human can then see how their input has improved (or worsened) the bounding volume across the frames of the video, allowing the manually-annotated bounding volume to be highly accurate. Once the human annotator has completed their annotation of the video, one or more frames of the video can be extracted therefrom and used as training examples to train an ANN in combination with the manual bounding volume annotation data.

In another example, a model of an object could be made and used to generate simulated training images and corresponding bounding volume or other annotation data. This could be done by generating a simulated image of an object at a particular pose (e.g., a pose that is compatible with the simulated object resting on a surface detected in a non-simulated image of a background environment) and compositing that image of the object into an image of a background environment to generate the training image.

An ANN can be trained (e.g., parameters thereof updated using backpropagation or other methods) in a variety of ways using a training image and related annotation information (e.g., the locations of bounding volume vertices, key point locations, object locations, or other annotation information related to the location, orientation, and/or pose of object(s) within the image). This can include using a location of an object in a training image to generate a target heat map. The location could be part of the annotation data and/or could be determined therefrom (e.g., as an average of a set of vertices that define a bounding volume or some other key points). The target heat map can then be compared to the heat map output from the ANN when presented with the training image, and the comparison used to update parameters of the ANN (e.g., parameters of a base network of the ANN and a detection head of the ANN). Such a comparison can include determining pairwise differences between pixels of the target heat map and pixels of the output heat map. For example, an L2 distance (or some other distance metric) between the pixels of the target heat map and the pixels of the output heat map could be determined and used (e.g., as a cost function) to update parameters of the ANN.

Additionally or alternatively, training the ANN can include using a location of an object in a training image and a location of a vertex or other key point within the image to generate a target first-axis displacement map and a target second-axis displacement map for the vertex. The object and/or vertex locations could be part of the annotation data and/or could be determined therefrom (e.g., as an average of a set of vertices that define a bounding volume or some other key points). A target displacement map can then be compared to a corresponding displacement map output from the ANN when presented with the training image, and the comparison used to update parameters of the ANN (e.g., parameters of a base network of the ANN and a regression head of the ANN). Such a comparison can include determining pairwise differences between pixels of the target displacement map and pixels of the output displacement map. For example, an L1 distance (or some other distance metric) between the pixels of the target displacement map and the pixels of the output displacement map could be determined and used (e.g., as a cost function) to update parameters of the ANN. To reduce the effects of outliers or to provide some other benefit, such a distance could be determined based only on the portion of pixels of the target and output displacement maps that are within a specified distance of the location of the object within the image. Additionally or alternatively, such a distance could be determined based only on the portion of pixels of the target and output displacement maps that are within a specified distance of the location of the object within the image, based only on the portion of pixels of the target and output displacement maps that correspond to supra-threshold pixels of the target and/or output heat map, and/or based only on a portion of the pixels of the target and output displacement maps that is defined in some other manner.

In some implementations, the above ANN (or other machine learning model or algorithm), used to generate a heat map and a set of displacement maps from an input image, can be augmented to generate intermediate "shape" data for the image. This shape data can include segmentation maps of the image that indicate regions of the image occupied by the object(s), coordinate maps indicating the relative or absolute locations, in space, of the surfaces of the object(s) that are visible in the image, or other information about the extent, size, features, or other shape information about the object(s) in an image. This high-dimensional data can then be used by downstream sub-network(s) of the ANN to improve the estimation of heat maps and displacement maps from the input image.

IV. Example Bounding Volume Detection and Tracking System

Figure 6A:
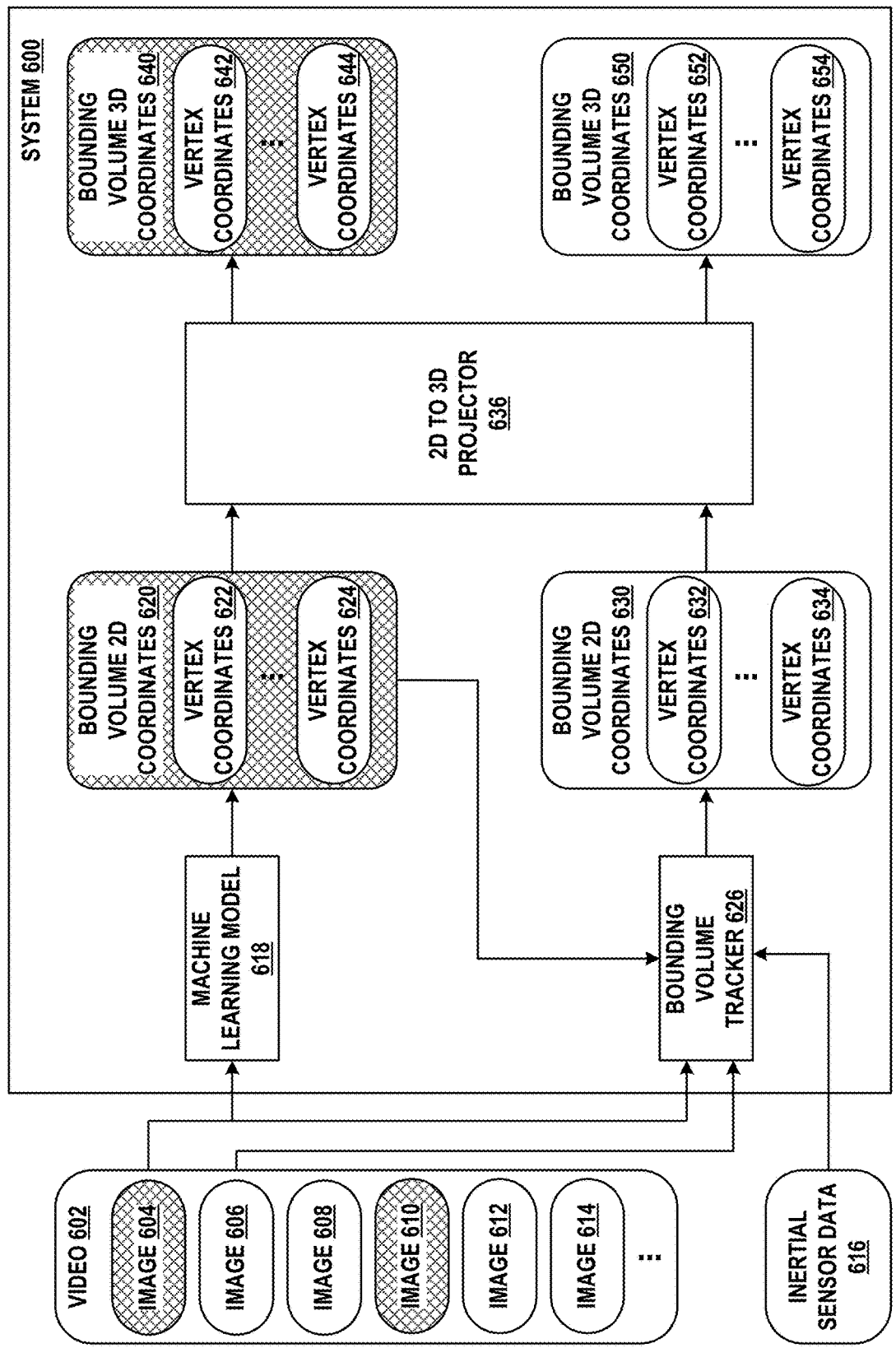
FIGS. 6A, 6B, and 6C illustrate aspects of a system, in accordance with examples described herein.
Figure 6B:
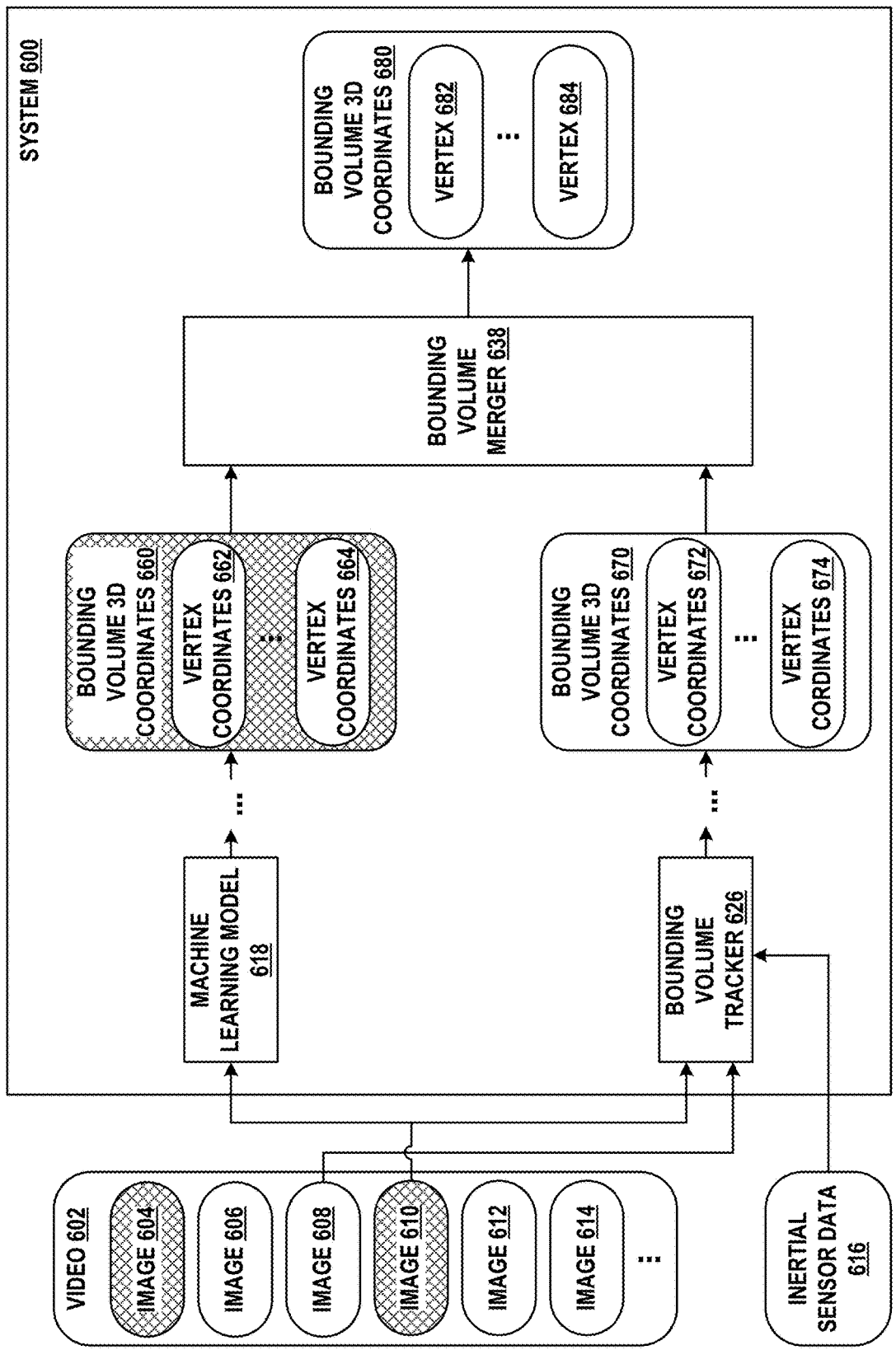
Figure 6C:
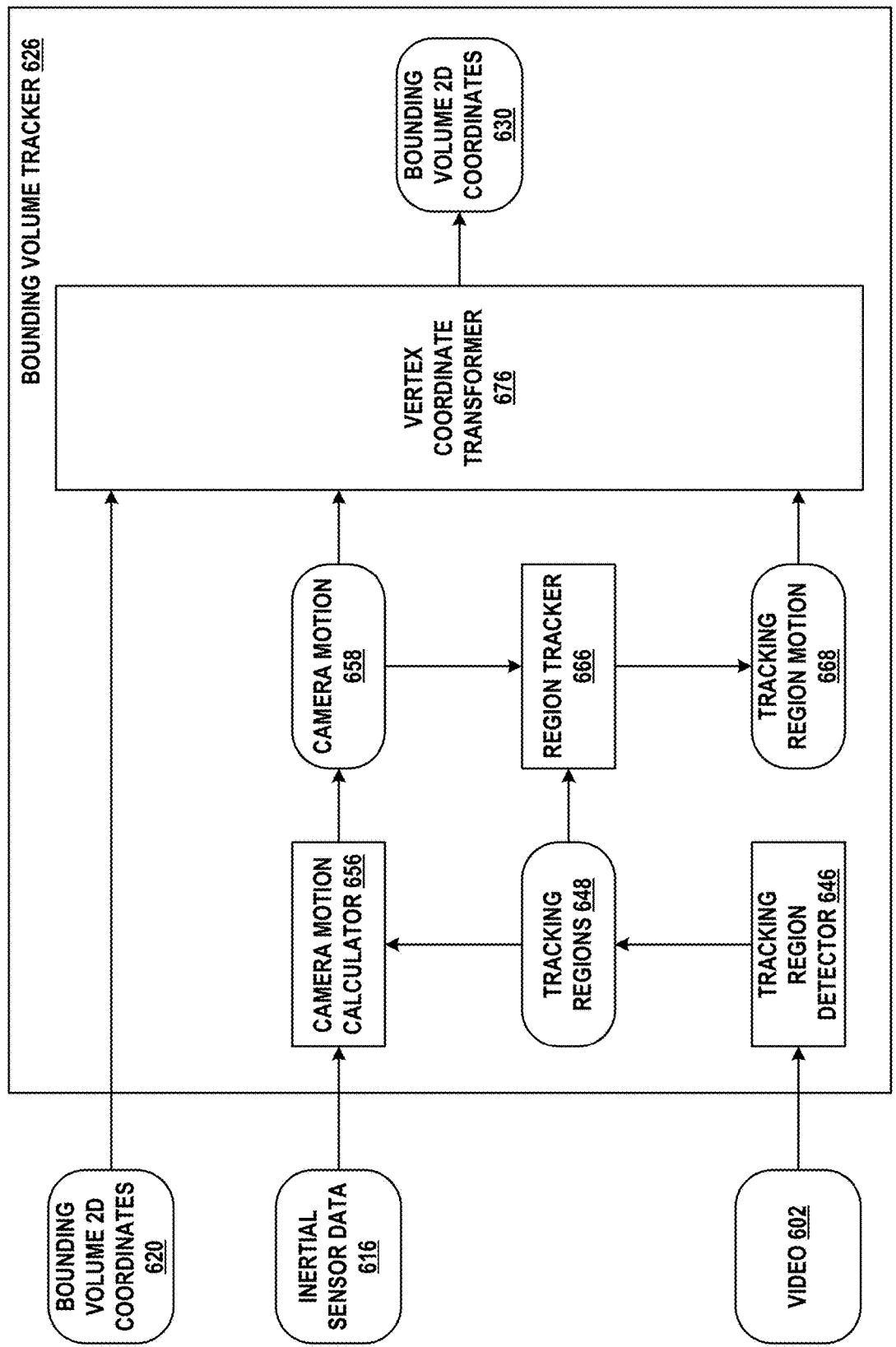

FIGS. 6A, 6B, and 6C illustrate an example system that may be used to detect and track, across one or more images, the pose (i.e., position, orientation, and/or size) of a bounding volume for an object. Specifically, system 600 may include machine learning model 618, bounding volume tracker 626, 2D to 3D projector 636, and bounding volume merger 638. The components of system 600 may be implemented as hardware components (e.g., as purpose-built circuitry) and/or software instructions (e.g., configured to be executed by general purpose hardware). System 600 may form part of computing device 100 and/or computing system 200.

Specifically, system 600 may be configured to detect and track the bounding volume indicative of the pose of an object represented in video 602. Video 602 may include a plurality of images, including image 604, image 606, and image 608 (i.e., images 604-608), and image 610, image 612, and image 614 (i.e., images 610-614). Video 602 may be associated with inertial sensor data 616 generated by one or more inertial sensors (e.g., gyroscopes, accelerometers, etc.) of a camera device during the capture of video 602. Video 602 may also be associated with metadata that defines 3D features identified within and based on the images of video 602. For example, the 3D features may include a 3D world reference frame, a camera pose (e.g., for each image) relative to the 3D world reference frame, one or more points of a point cloud, estimated lighting, and/or one or more planar surfaces detected within a scene represented by video 602. The metadata may be generated by, for example, an augmented reality (AR) software application and/or a Simultaneous Localization and Mapping (SLAM) software application, among others.

Machine learning model 618 may be configured to process one or more of the images of video 602 to detect, based thereon, 2D coordinates of vertices of a bounding volume of an object represented by the images. Machine learning model 618 may represent, for example, ANN 500.

Rather than processing every image of video 602, machine learning model 618 may be configured to process a subset of the images of video 602. In one example, machine learning model 618 may be used to process every Nth image of video 602, where N is equal to or greater than two. In the implementation illustrated in FIGS. 6A and 6B, N is equal to three. Thus, machine learning model 618 may be configured to process image 604 and image 610, as indicated by the hatched pattern thereof, but not images 606, 608, 612, and 614. In another example, the rate at which machine learning model 618 processes images of video 602 may depend on an amount of computational resources available at a given time. Thus, the rate may vary over time, resulting in the value of N changing as the amount of available computational resources changes (e.g., based on other computational tasks performed by a computing device that includes/provides system 600).

Specifically, machine learning model 618 may be configured to generate bounding volume 2D coordinates 620 based on image 604. Bounding volume 2D coordinates 620 may include vertex coordinates 622 through vertex coordinates 624. For example, the bounding volume may be a cuboid (which may alternatively be referred to as a rectangular prism or a box), and vertex coordinates 622-624 may thus represent the coordinates of eight corner vertices corresponding to corners of the cuboid and/or at least one center vertex corresponding to a center of the cuboid. Specifically, bounding volume 2D coordinates 620 may represent the position of a projection of each of the vertices of the 3D cuboid onto 2D space of image 604.

2D to 3D projector 636 may be configured to project bounding volume 2D coordinates 620 from 2D to 3D, thus generating bounding volume 3D coordinates 640. Bounding volume 3D coordinates 640 may include vertex coordinates 642 through vertex coordinates 644 (corresponding to vertex coordinates 622-624, respectively), which may be expressed in a 3D camera reference frame and/or the 3D world reference frame, among other possibilities. 2D to 3D projector 636 may include one or more Perspective-n-Point (PnP) algorithms, such as the Efficient PnP (EPnP) algorithm. The one or more PnP algorithms may allow for determination of bounding volume 3D coordinates 640 based on bounding volume 2D coordinates 620 and intrinsic camera parameters of the camera used to capture video 602.

Based on bounding volume 2D coordinates 620, a representation of the bounding volume may be overlaid onto image 604 to visually illustrate the bounding volume within image 604. Similarly, based on bounding volume 3D coordinates 640, a representation of the bounding volume may be inserted into a 3D model corresponding to video 602 to visually illustrate the bounding volume, as determined based on image 604, within the 3D model.

Machine learning model 618 could also be used to process image 606, image 608, and so on to generate, for each image, a corresponding set of bounding volume 2D coordinates. However, such repeated processing of images by machine learning model 618 may be computationally costly and/or may result in degraded accuracy. For example, machine learning model 618 may be constructed from a combination of relatively fast and/or lightweight layers and/or operation (e.g., resulting, in some cases, in a number of parameters of machine learning model 618 being less than a threshold number of parameters) so as to allow machine learning model 618 to process images of video 602 at the same rate as these images are generated. However, reducing the number of parameters and/or altering the structure of the layers of machine learning model 618 may result in reduced accuracy of the outputs thereof (e.g., a bounding volume that does not accurately contain the corresponding object). Additionally, determining a corresponding set of bounding volume 2D coordinates by machine learning model 618 for each image of video 602 may result in bounding volume jitter. That is, the bounding volume may appear to shake, vibrate, and/or otherwise move around due to variations in the bounding volume 2D coordinates determined by machine learning model 618, and its appearance across consecutive images may thus be inconsistent.

Accordingly, rather than using machine learning model 618 to process every frame of video 602, machine learning model 618 may be used to determine bounding volume 2D coordinates based on a subset of images of video 602, and bounding volume tracker 626 may be used to track the bounding volume across image frames of video 602. Thus, rather than processing image 606 with machine learning model 618 to determine the bounding volume therein, bounding volume tracker 626 may be configured to track the position and/or movement of bounding volume 2D coordinates 620 from image 604 to image 606. That is, bounding volume tracker 626 may be configured to determine bounding volume 2D coordinates 630, which may represent bounding volume 2D coordinates 620 adjusted based on a change in camera pose and/or a change in object pose (e.g., movement of an object that is independent of the change in camera pose) between image 604 and image 606. Bounding volume 2D coordinates 630 may include vertex coordinates 632 through vertex coordinates 634 (corresponding to vertex coordinates 622-624, respectively), which may represent positions of corresponding bounding volume vertices within image 606.

Accordingly, the number of parameters of machine learning model 618, and thus its accuracy, may be increased without sacrificing speed. For example, by using machine learning model 618 in combination with bounding volume tracker 626, system 600 may be able to operate at 26 frames per second or faster on mobile devices and/or other computationally-limited devices. Additionally, by relying on machine learning model 618 to detect the bounding volume (and thus the pose of the object), system 600 may operate without reliance on parallax-inducing motion to initialize and locate the object and/or determine its pose.

2D to 3D projector 636 may be configured to determine bounding volume 3D coordinates 650 based on bounding volume 2D coordinates 630. Bounding volume 3D coordinates 650 may include vertex coordinates 652 through vertex coordinates 654 (corresponding to vertex coordinates 632-634, respectively), which may be expressed in the 3D camera reference frame and/or the 3D world reference frame, among other possibilities.

Bounding volume tracker 626 may also be configured to track movement of bounding volume 2D coordinates 630 from image 606 to image 608. That is, bounding volume tracker 626 may be configured to generate further bounding volume 2D coordinates, which may represent bounding volume 2D coordinates 630 adjusted based on a change in camera pose and/or a change in object pose between image 606 and image 608. Such tracking may be repeated until, for example, a new set of bounding volume 2D coordinates is determined by machine learning model 618.

Accordingly, as shown in FIG. 6B, machine learning model 618 may be used to generate, based on image 610, additional bounding volume 3D coordinates. Specifically, machine learning model 618 may be configured to generate, based on image 610, additional bounding volume 2D coordinates, as indicated by the corresponding ellipsis. 2D to 3D projector 636 may be configured to generate, based on the additional bounding volume 2D coordinates corresponding to image 610, bounding volume 3D coordinates 660. Thus, bounding volume 3D coordinates 660 may be a result of detection, rather than tracking, of the bounding volume in image 610. Bounding volume 3D coordinates 660 may include vertex coordinates 662 through vertex coordinates 664 (corresponding to vertex coordinates 622-624, respectively).

Additionally, bounding volume tracker 626 may be configured to track movement of the bounding volume 2D coordinates from image 608 to image 610. That is, bounding volume tracker 626 may be configured to generate further bounding volume 2D coordinates, indicated by the corresponding ellipsis, which may represent the bounding volume 2D coordinates associated with image 608 adjusted based on a change in camera pose and/or a change in object pose between image 608 and image 610. Further, 2D to 3D projector 636 may be configured to generate, based on the further bounding volume 2D coordinates corresponding to image 610, bounding volume 3D coordinates 670. Thus, bounding volume 3D coordinates 670 may be a result of tracking, rather than detection, of the bounding volume from image 604 to image 610. Bounding volume 3D coordinates 670 may include vertex coordinates 672 through vertex coordinates 674 (corresponding to vertex coordinates 662-664, respectively).

Bounding volume merger 638 may be configured to generate, based on bounding volume coordinates 660 and 670, bounding volume 3D coordinates 680. Thus, bounding volume merger 638 may be configured to combine the results of (i) detection of the bounding volume in image 610 by machine learning model 618 and (ii) tracking of the bounding volume (initially detected in image 604 by machine learning model 618) from image 604 to image 610. Such combination of the detection and tracking results may further reduce any apparent jitter, thus making the bounding volume appear more consistent across images of video 602. Bounding volume 3D coordinates 680 may include vertex coordinates 682 through vertex coordinates 684 (corresponding to vertex coordinates 662-664, respectively, and vertex coordinates 672-674, respectively).

In one example, bounding volume 3D coordinates 680 may be determined by determining an intersection of (i) the bounding volume as defined by coordinates 660 and (ii) the bounding volume as defined by coordinates 670. Bounding volume coordinates 680 may be determined based on this intersection by, for example, selecting coordinates that center and/or otherwise align the bounding volume as defined by coordinates 680 with this intersection. In another example, bounding volume merger 638 may determine a weighted average of the respective positions of the vertices of the bounding volumes as defined by coordinates 660 and coordinates 670. The weight-averaged positions may be further adjusted or modified so that the bounding volume as defined by coordinates 680 has, for example, a cuboid shape. Other approaches for merging/combining the bounding volume as defined by coordinates 660 and the bounding volume as defined by coordinates 670 may be possible.

In some cases, bounding volume 3D coordinates 680 may be projected back into image space of image 610, and a representation of the bounding volume as defined by coordinates 680 may be displayed within image 610. In other implementations, bounding volume merger 638 may be configured to operate on 2D coordinates instead of 3D coordinates. Thus, bounding volume merger may operate on the output of machine learning model 618 and bounding volume tracker 626, and the output of bounding volume merger 638 may be processed by 2D to 3D projector to generate bounding volume 3D coordinates 680.

In some implementations, bounding volume 3D coordinates 670 and/or the 2D coordinates corresponding thereto may be temporarily displayed before bounding volume 3D coordinates 660 and/or the 2D coordinates corresponding thereto are generated, thus reducing and/or eliminating any lag due to processing by machine learning model 618. In one example, an image processing rate of machine learning model 618 may be half of a frame rate of video 602, and a processing rate of bounding volume tracker 626 may exceed the frame rate of video 602. Thus, bounding volume 3D coordinates 670 corresponding to image 610 may be ready before image 610 is displayed, while bounding volume 3D coordinates 660 may be ready before image 612 is displayed, but after image 610 is displayed.

Accordingly, bounding volume 3D coordinates 670 may be used to display the bounding volume within image 610, since bounding volume 3D coordinates 660 might not yet have been generated. Once bounding volume 3D coordinates 660 are generated, bounding volume 3D coordinates 680 may be determined for image 610, and may be tracked by bounding volume tracker 626 to image 612. Accordingly, bounding volume 3D coordinates 680, as tracked to image 612, may be used to display the bounding volume within image 612. The displayed representation of bounding volume in image 612 may be based on both (i) the detection of the bounding volume by machine learning model 618 in image 610 and (ii) tracking of the bounding volume by bounding volume tracker 626, while the displayed representation of bounding volume in image 610 may be based on tracking but might not be based on detection. In this way, tracking may allow system 600 to operate at the same rate as images of video 602 are generated even when machine learning model 618 processes images at a rate lower than that of video 602. Thus, system 600 may appear to operate substantially in real-time and/or without perceptible delay.

In some implementations, bounding volume merger 638 may be omitted. Thus, the bounding volume corresponding to image 610 may be determined using machine learning model 618 and without using bounding volume tracker 626. Accordingly, each new bounding volume detection generated by machine learning model 618 may completely replace a corresponding bounding volume tracked by bounding volume tracker 626 from prior images. Thus, for example, bounding volume 3D coordinates 660 may be used in place of, rather than in combination with, bounding volume 3D coordinates 670. Such an approach may be utilized, for example, when machine learning model 618 is configured to process images at a rate that is equal to or exceeds a frame rate of video 602.

FIG. 6C illustrates an example implementation of bounding volume tracker 626. Specifically, bounding volume tracker 626 may include tracking region detector 646, camera motion calculator 656, region tracker 666, and/or vertex coordinate transformer 676. Bounding volume tracker 626 may be based on and/or include aspects of the tracker discussed in a paper titled "Instant Motion Tracking and Its Applications to Augmented Reality," authored by Jianing Wei, Genzhi Ye, Tyler Mullen, Matthias Grundmann, Adel Ahmadyan, and Tingbo Hou, published on Jul. 16, 2019 as arXiv:1907.06796.

Tracking region detector 646 may be configured to detect, within the images that make up video 602, tracking regions 648. Tracking regions 648 may include any visual features that can be tracked across two or more images, such as objects, surfaces, and/or visual features thereof, among other possibilities. Tracking regions 648 may include stationary features that remain fixed relative to the world reference frame across images (e.g., a traffic sign) and mobile features that move relative to the world reference frame across images (e.g., a vehicle). Tracking regions 648 may be visually distinct from one another, and each tracking region may be assigned a unique identifier that facilitates tracking thereof across images.

Camera motion calculator 656 may be configured to determine camera motion 658 based on tracking regions 648 and/or inertial sensor data 616. Camera motion 658 may include a translation and/or rotation of a camera device used to capture video 602. Specifically, camera motion 658 may represent the camera translation and/or rotation taking place between the capture of two images of video 602. Thus, for example, camera motion 658 may represent the translation and/or rotation of the camera from a first pose of the camera while capturing image 604 to a second pose of the camera while capturing image 606. Apparent motion of tracking regions 648 across images of video 602 and/or inertial sensor data 616 may be associated with and/or caused by motion of the camera, and may thus be used to determine camera motion 658. Camera motion calculator 656 may determine camera motion 658 using a translation model having two degrees of freedom, a similarity model having four degrees of freedom, and/or a homography model having eight degrees of freedom, among other possibilities.

Region tracker 666 may be configured to determine tracking region motion 668 of tracking regions 648 based on camera motion 658. For example, tracking region motion 668 may represent actual motion of tracking regions 648 relative to the world reference frame, rather than apparent motion induced by camera motion 658. Tracking region motion 668 may include, for each respective tracking region of tracking regions 648, one or more vectors indicative of a change in position of one or more portions of the respective tracking regions between images.

Vertex coordinate transformer 676 may be configured to determine bounding volume 2D coordinates 630 based on bounding volume 2D coordinates 620, camera motion 658, and/or tracking region motion 668. Bounding volume 2D coordinates 620 and 630 corresponding to images 604 and 606, respectively, are shown in FIG. 6C the purpose of example. Vertex coordinate transformer 676 may alternatively and/or additionally transform the coordinates of bounding volume vertices in other images of video 602. Alternatively, in some implementations, vertex coordinate transformer 676 may instead be configured to determine bounding volume 2D coordinates 630 based on bounding volume 3D coordinates 640.

Vertex coordinate transformer 676 may determine, based on camera motion 658 and/or tracking region motion 668, a transformation, such as a homography transformation or a perspective transformation. Vertex coordinate transformer 676 may apply this transformation to bounding volume 2D coordinates 620 to determine bounding volume 2D coordinates 630. In some implementations, vertex coordinate transformer 676 may be configured to determine the transformation such that vertices of the bounding volume are displaced, from coordinates 620 to coordinates 630, along a plane underlying the bounding volume. That is, vertex coordinate transformer 676 may operate under the assumption that the bounding volume rests on and/or is associated with a planar surface. Thus, bounding volume tracker 626 may be alternatively referred to as a planar tracker. The assumption that the 2D coordinates of the bounding volume rest on a plane associated with the object may simplify the operations of bounding volume tracker 626.

In some implementations, bounding volume tracker 626 may be configured to divide the task of tracking the 2D coordinates of the bounding volume into two box tracking sub-tasks. For example, bounding volume tracker 626 may be configured to track (i) a first position of a first quadrilateral that forms part of the bounding volume along the plane underlying the bounding volume and (ii) a second position of a second quadrilateral that forms part of the bounding volume along the plane. The first quadrilateral may define a first plane associated with the bounding volume, such as a bottom of a cuboid, and may include a first subset of the plurality of vertices of the bounding volume. The second quadrilateral may define a second plane of the bounding volume, such as a top of the cuboid, and may include a second subset of the plurality of vertices of the bounding volume.

V. Example Bounding Volume Detection and Tracking

Figure 7A:
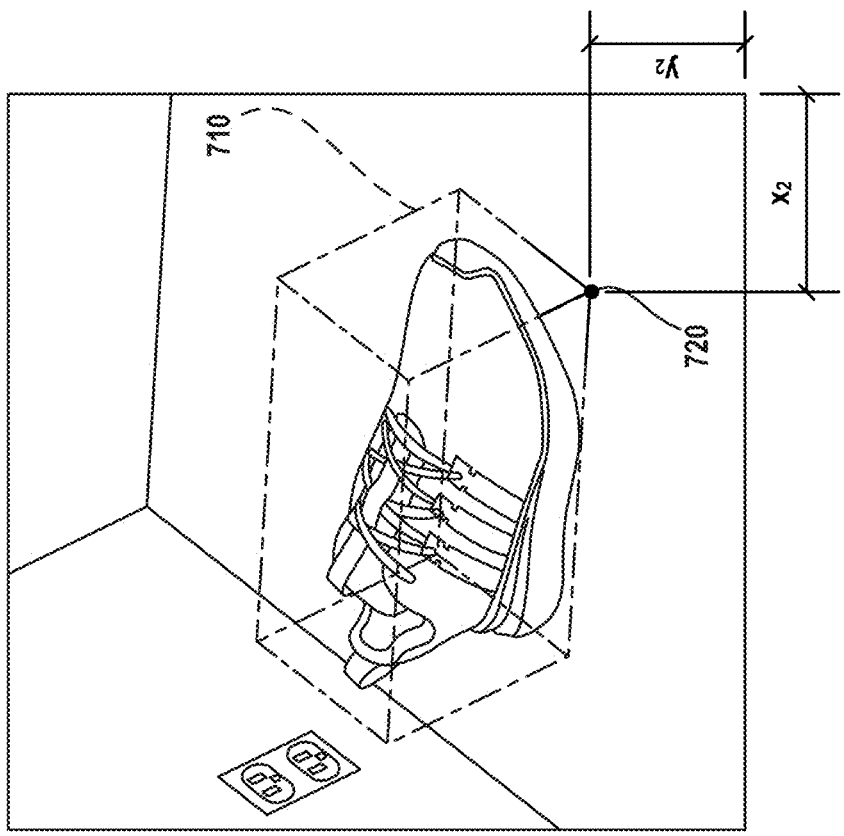
FIG. 7A illustrates an image of a scene, in accordance with examples described herein.
Figure 7B:
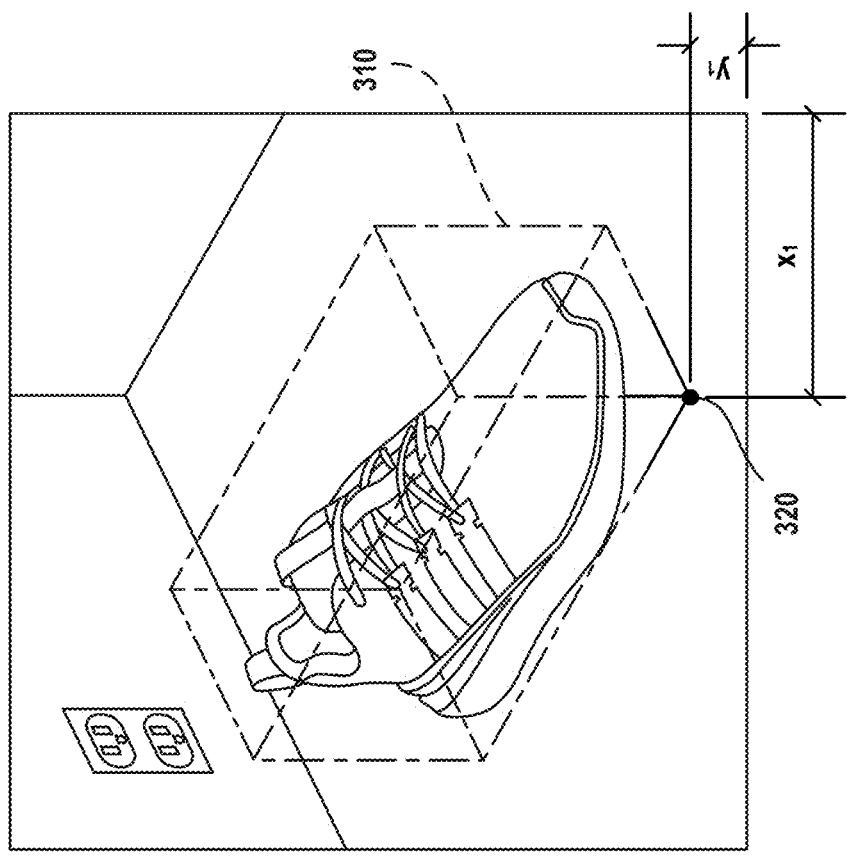
FIG. 7B illustrates an image of the scene from FIG. 7A captured from a different perspective, in accordance with examples described herein.

FIGS. 7A and 7B provide a visual illustration of detection and tracking of a bounding volume. Specifically, FIG. 7A (corresponding to FIG. 3B) illustrates bounding box 310 that may be the result of detection by machine learning model 618. Bounding box 310 may be detected based on, for example, image 604, which may represent the scene, including the shoe, shown in FIG. 7A. Thus, 2D coordinates of vertex 320 may be represented as part of bounding volume coordinates 620 (e.g., by vertex coordinates 622). The horizontal and vertical 2D coordinates of vertex 320, defined relative to a lower left corner of the image, are $x_1$ and $y_1$, respectively.

FIG. 7B illustrates bounding box 710 that is the result of tracking of bounding box 310 by bounding volume tracker 626 across two or more images. Bounding volume tracker 626 may track the respective positions of vertices of bounding box 310 along a plane defined by the sole of the shoe and/or the floor on which the shoe rests. Bounding box 710 may be determined, for example, by tracking bounding box 310 from image 604 to image 606, which may represent the scene, including the shoe, from a different perspective than that of image 604. Thus, 2D coordinates of vertex 720, corresponding to vertex 320, may be represented as part of bounding volume coordinates 630 (e.g., by vertex coordinates 632). The horizontal and vertical 2D coordinates of vertex 720, defined relative to a lower left corner of the image, are $x_2$ and $y_2$, respectively.

Due to the change in perspective between the images shown in FIGS. 7A and 7B, the respective positions of the vertices of bounding box 710 are different than the respective positions of corresponding vertices of bounding box 310. For example, the $x_1$ and $y_1$ coordinates of vertex 320 are different than the $x_2$ and $y_2$ coordinates of vertex 720, with $x_2$ being smaller than $x_1$ and $y_2$ being greater than $y_1$ due to the translation and/or rotation of the camera. However, the pose of bounding box 710 relative to the shoe remains the same as the pose of bounding box 310 relative to the shoe. Thus, as the camera moves relative to the shoe, the bounding box is updated so that it appears to remain fixed relative to the shoe, thereby continuing to indicate the pose of the shoe within the environment.

VI. Additional Example Operations

Figure 8:
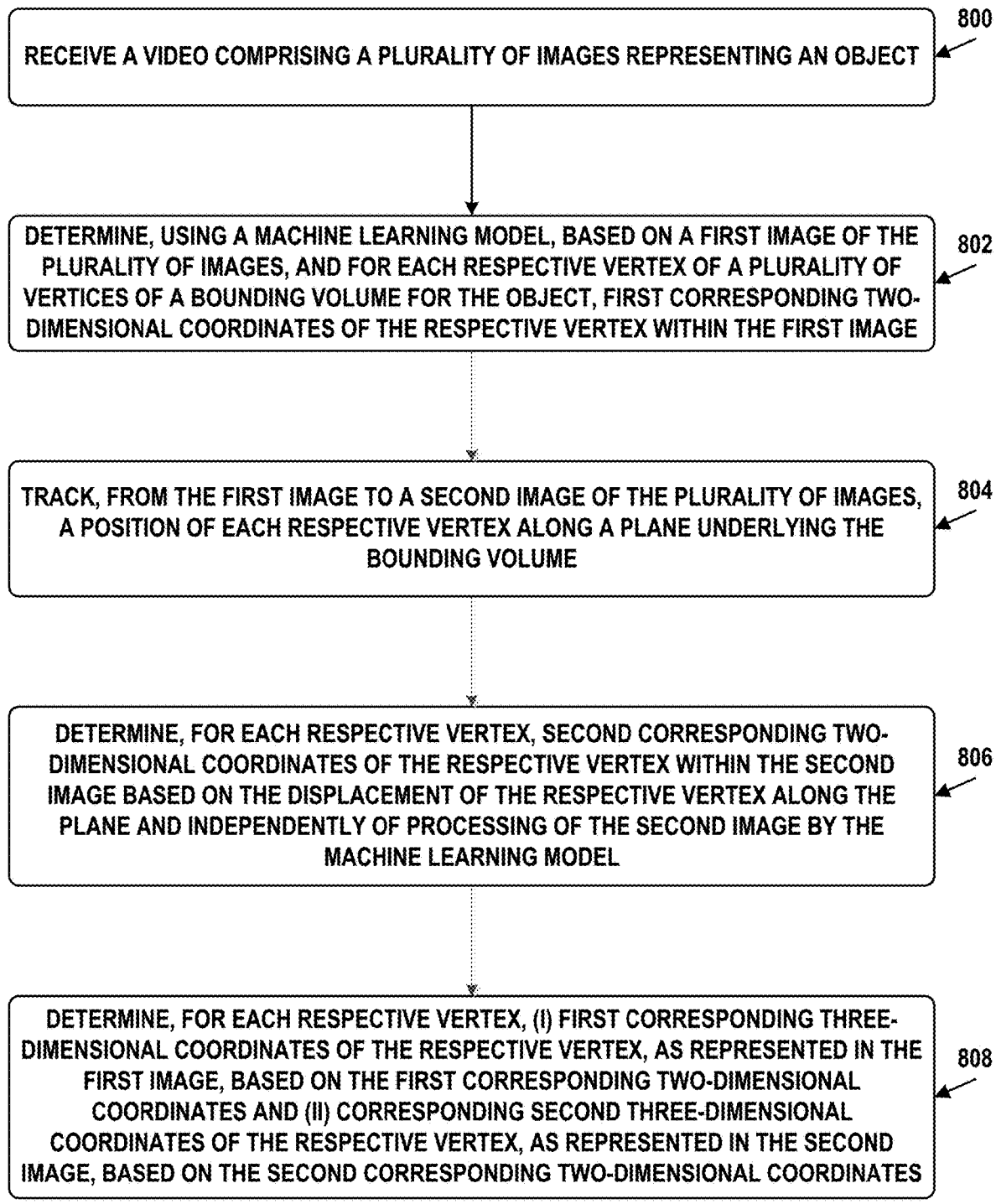
FIG. 8 illustrates a flow chart, in accordance with examples described herein.

FIG. 8 illustrates a flow chart of operations related to detection and tracking of a bounding volume for an object. The operations may be carried out by computing device 100, computing system 200, ANN 500, and/or system 600, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may involve receiving a video comprising a plurality of images representing an object.

Block 802 may involve determining, using a machine learning model, based on a first image of the plurality of images, and for each respective vertex of a plurality of vertices of a bounding volume for the object, first corresponding two-dimensional coordinates of the respective vertex within the first image.

Block 804 may involve tracking, from the first image to a second image of the plurality of images, a position of each respective vertex along a plane underlying the bounding volume.

Block 806 may involve determining, for each respective vertex, second corresponding two-dimensional coordinates of the respective vertex within the second image based on the position of the respective vertex along the plane and independently of processing of the second image by the machine learning model.

Block 808 may involve determining, for each respective vertex, (i) first corresponding three-dimensional coordinates of the respective vertex, as represented in the first image, based on the first corresponding two-dimensional coordinates and (ii) corresponding second three-dimensional coordinates of the respective vertex, as represented in the second image, based on the second corresponding two-dimensional coordinates.

In some embodiments, for each respective vertex of the bounding volume, third corresponding two-dimensional coordinates of the respective vertex within the third image may be determined by the machine learning model and based on a third image of the plurality of images. For each respective vertex, corresponding intermediate three-dimensional coordinates of the respective vertex may be determined based on the third corresponding two-dimensional coordinates. For each respective vertex, corresponding third three-dimensional coordinates of the respective vertex, as represented in the third image, may be determined based on an intersection of (i) the bounding volume as defined by the corresponding second three-dimensional coordinates of each respective vertex and (ii) the bounding volume as defined by the corresponding intermediate three-dimensional coordinates of each respective vertex.

In some embodiments, tracking the position of each respective vertex along the plane may include determining, based on an apparent motion of one or more image regions from the first image to the second image, a motion of a camera device that captured the video. The position of each respective vertex along the plane may be tracked based on the motion of the camera device.

In some embodiments, tracking the position of each respective vertex along the plane may include determining a motion of one or more reference objects between the first image to the second image. The position of each respective vertex along the plane may be tracked based on the motion of the one or more reference objects.

In some embodiments, tracking the position of each respective vertex along the plane may include determining, based on inertial sensor data generated by one or more inertial sensors, a motion of a camera device that captured the video. The position of each respective vertex along the plane may be tracked based on the motion of the camera device.

In some embodiments, tracking the position of each respective vertex along the plane may include tracking a first position of a first quadrilateral along the plane and tracking a second position of a second quadrilateral along the plane. The first quadrilateral may define a first plane of the bounding volume and may include a first subset of the plurality of vertices of the bounding volume. The second quadrilateral may define a second plane of the bounding volume and may include a second subset of the plurality of vertices of the bounding volume.

In some embodiments, the machine learning model might include no more than a threshold number of parameters such that the machine learning model is executable by a mobile computing device to process images at no less than a threshold rate.

In some embodiments, the machine learning model might be configured to process images at no less than a threshold rate. A frame rate of the video may exceed the threshold rate. A number of consecutive images for which corresponding two-dimensional coordinates of each respective vertex are determined (i) by tracking the position thereof along the plane underlying the bounding volume and (ii) independently of processing of the consecutive images by the machine learning model may be based on a difference between the threshold rate and the frame rate.

In some embodiments, a first visual representation of the bounding volume may be displayed within the first image based on the first corresponding two-dimensional coordinates of each respective vertex within the first image. A second visual representation of the bounding volume may be displayed within the second image based on the second corresponding two-dimensional coordinates of each respective vertex within the second image.

In some embodiments, the object may belong to a particular class, and the machine learning model may have been trained to generate corresponding two-dimensional coordinates of vertices of bounding volumes for objects belonging to the particular class.

In some embodiments, the machine learning model may include an artificial neural network that includes (i) an encoder that includes one or more convolution layers and one or more inverted residual blocks and (ii) a decoder that includes a deconvolution layer and one or more inverted residual blocks.

In some embodiments, determining, for each respective vertex, the first corresponding three-dimensional coordinates of the respective vertex may include determining the first corresponding three-dimensional coordinates using a Perspective-n-Point (PnP) algorithm based on the first corresponding two-dimensional coordinates and intrinsic camera parameters. Determining, for each respective vertex, the second corresponding three-dimensional coordinates of the respective vertex may include determining the second corresponding three-dimensional coordinates using the PnP algorithm based on the second corresponding two-dimensional coordinates and the intrinsic camera parameters.

In some embodiments, the bounding volume for the object may include a cuboid. The plurality of vertices of the cuboid may include eight corner vertices representing corners of the cuboid and one center vertex representing a center of the cuboid.

In some embodiments, determining, for each respective vertex of the bounding volume for the object, the first corresponding two-dimensional coordinates may include generating, by the machine learning model and based on the first image, (i) a heat map containing a probability distribution that represents a position of the object within the first image and (ii) a plurality of displacement maps. Each respective displacement map of the plurality of displacement maps may represent a displacement of each pixel of the first image relative to a projection, onto the first image, of a corresponding vertex of the bounding volume for the object. Based on the heat map, a peak pixel of the heat map may be selected to represent a center of the object. For each respective vertex of the bounding volume, the first corresponding two-dimensional coordinates within the first image may be determined based on the peak pixel and the corresponding displacement map of the plurality of displacement maps.

In some embodiments, the probability distribution that represents the position of the object within the image may be a normal distribution that includes (i) a mean that represents a center of the object within the image and (ii) a standard deviation that is proportional to a size of the object within the image.

In some embodiments, determining, for each respective vertex of the bounding volume, the corresponding two-dimensional coordinates may include selecting, from the corresponding displacement map, a displacement pixel that spatially corresponds to the peak pixel, and determining a sum of two-dimensional coordinates of the peak pixel and one or more values of the displacement pixel.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
receiving a video comprising a plurality of images representing an object;
determining, using a machine learning model, based on a first image of the plurality of images, and for each respective vertex of a plurality of vertices of a bounding volume for the object, first corresponding two-dimensional coordinates of the respective vertex within the first image;

tracking, from the first image to a second image of the plurality of images, a position of each respective vertex along a plane underlying the bounding volume;

determining, for each respective vertex, second corresponding two-dimensional coordinates of the respective vertex within the second image based on the position of the respective vertex along the plane and independently of processing of the second image by the machine learning model; and determining, for each respective vertex, (i) first corresponding three-dimensional coordinates of the respective vertex, as represented in the first image, based on the first corresponding two-dimensional coordinates and (ii) corresponding second three-dimensional coordinates of the respective vertex, as represented in the second image, based on the second corresponding two-dimensional coordinates.

2. The computer-implemented method of claim 1, further comprising:

determining, by the machine learning model, based on a third image of the plurality of images, and for each respective vertex of the bounding volume, third corresponding two-dimensional coordinates of the respective vertex within the third image;

determining, for each respective vertex, corresponding intermediate three-dimensional coordinates of the respective vertex based on the third corresponding two-dimensional coordinates; and determining, for each respective vertex, corresponding third three-dimensional coordinates of the respective vertex, as represented in the third image, based on an intersection of (i) the bounding volume as defined by the corresponding second three-dimensional coordinates of each respective vertex and (ii) the bounding volume as defined by the corresponding intermediate three-dimensional coordinates of each respective vertex.

3. The computer-implemented method of claim 1, wherein tracking the position of each respective vertex along the plane comprises:

determining, based on an apparent motion of one or more image regions from the first image to the second image, a motion of a camera device that captured the video; and tracking the position of each respective vertex along the plane based on the motion of the camera device.

4. The computer-implemented method of claim 1, wherein tracking the position of each respective vertex along the plane comprises:

determining a motion of one or more reference objects between the first image to the second image; and tracking the position of each respective vertex along the plane based on the motion of the one or more reference objects.

5. The computer-implemented method of claim 1, wherein tracking the position of each respective vertex along the plane comprises:

determining, based on inertial sensor data generated by one or more inertial sensors, a motion of a camera device that captured the video; and tracking the position of each respective vertex along the plane based on the motion of the camera device.

6. The computer-implemented method of claim 1, wherein tracking the position of each respective vertex along the plane comprises:

tracking a first position of a first quadrilateral along the plane, wherein the first quadrilateral defines a first plane of the bounding volume and comprises a first subset of the plurality of vertices of the bounding volume; and tracking a second position of a second quadrilateral along the plane, wherein the second quadrilateral defines a second plane of the bounding volume comprises a second subset of the plurality of vertices of the bounding volume.

7. The computer-implemented method of claim 1, wherein the machine learning model comprises no more than a threshold number of parameters such that the machine learning model is executable by a mobile computing device to process images at no less than a threshold rate.

8. The computer-implemented method of claim 1, wherein the machine learning model is configured to process images at no less than a threshold rate, wherein a frame rate of the video exceeds the threshold rate, and wherein a number of consecutive images for which corresponding two-dimensional coordinates of each respective vertex are determined (i) by tracking the position thereof along the plane underlying the bounding volume and (ii) independently of processing of the consecutive images by the machine learning model is based on a difference between the threshold rate and the frame rate.

9. The computer-implemented method of claim 1, further comprising:

based on the first corresponding two-dimensional coordinates of each respective vertex within the first image, displaying a first visual representation of the bounding volume within the first image; and based on the second corresponding two-dimensional coordinates of each respective vertex within the second image, displaying a second visual representation of the bounding volume within the second image.

10. The computer-implemented method of claim 1, wherein the object belongs to a particular class, and wherein the machine learning model has been trained to generate corresponding two-dimensional coordinates of vertices of bounding volumes for objects belonging to the particular class.

11. The computer-implemented method of claim 1, wherein the machine learning model comprises an artificial neural network comprising (i) an encoder that includes one or more convolution layers and one or more inverted residual blocks and (ii) a decoder that includes a deconvolution layer and one or more inverted residual blocks.

12. The computer-implemented method of claim 1, wherein determining, for each respective vertex, the first corresponding three-dimensional coordinates of the respective vertex comprises determining the first corresponding three-dimensional coordinates using a Perspective-n-Point (PnP) algorithm based on the first corresponding two-dimensional coordinates and intrinsic camera parameters, and wherein determining, for each respective vertex, the second corresponding three-dimensional coordinates of the respective vertex comprises determining the second corresponding three-dimensional coordinates using the PnP algorithm based on the second corresponding two-dimensional coordinates and the intrinsic camera parameters.

13. The computer-implemented method of claim 1, wherein the bounding volume for the object comprises a cuboid, and wherein the plurality of vertices of the cuboid comprises eight corner vertices representing corners of the cuboid and one center vertex representing a center of the cuboid.

14. The computer-implemented method of claim 1, wherein determining, for each respective vertex of the bounding volume for the object, the first corresponding two-dimensional coordinates comprises:
   generating, by the machine learning model and based on the first image, (i) a heat map containing a probability distribution that represents a position of the object within the first image and (ii) a plurality of displacement maps, wherein each respective displacement map of the plurality of displacement maps represents a displacement of each pixel of the first image relative to a projection, onto the first image, of a corresponding vertex of the bounding volume for the object;
   selecting, based on the heat map, a peak pixel of the heat map to represent a center of the object; and
   determining, for each respective vertex of the bounding volume, the first corresponding two-dimensional coordinates within the first image based on the peak pixel and the corresponding displacement map of the plurality of displacement maps.

15. A system comprising:
   a processor; and
   a non-transitory computer-readable medium having stored thereon instructions that, when executed by the processor, cause the processor to perform operations comprising:
      receiving a video comprising a plurality of images representing an object;
      determining, using a machine learning model, based on a first image of the plurality of images, and for each respective vertex of a plurality of vertices of a bounding volume for the object, first corresponding two-dimensional coordinates of the respective vertex within the first image;
      tracking, from the first image to a second image of the plurality of images, a position of each respective vertex along a plane underlying the bounding volume;
      determining, for each respective vertex, second corresponding two-dimensional coordinates of the respective vertex within the second image based on the position of the respective vertex along the plane and independently of processing of the second image by the machine learning model; and
      determining, for each respective vertex, (i) first corresponding three-dimensional coordinates of the respective vertex, as represented in the first image, based on the first corresponding two-dimensional coordinates and (ii) corresponding second three-dimensional coordinates of the respective vertex, as represented in the second image, based on the second corresponding two-dimensional coordinates.

16. The system of claim 15, wherein the operations further comprise:
   determining, by the machine learning model, based on a third image of the plurality of images, and for each respective vertex of the bounding volume, third corresponding two-dimensional coordinates of the respective vertex within the third image;
   determining, for each respective vertex, corresponding intermediate three-dimensional coordinates of the respective vertex based on the third corresponding two-dimensional coordinates; and
   determining, for each respective vertex, corresponding third three-dimensional coordinates of the respective vertex, as represented in the third image, based on an intersection of (i) the bounding volume as defined by the corresponding second three-dimensional coordinates of each respective vertex and (ii) the bounding volume as defined by the corresponding intermediate three-dimensional coordinates of each respective vertex.

17. The system of claim 15, wherein the machine learning model is configured to process images at no less than a threshold rate, wherein a frame rate of the video exceeds the threshold rate, and wherein a number of consecutive images for which corresponding two-dimensional coordinates of each respective vertex are determined (i) by tracking the position thereof along the plane underlying the bounding volume and (ii) independently of processing of the consecutive images by the machine learning model is based on a difference between the threshold rate and the frame rate.

18. An article of manufacture including a non-transitory computer-readable medium, having stored thereon program instructions that, upon execution by a computing system, cause the computing system to perform operations comprising:
   receiving a video comprising a plurality of images representing an object;
   determining, using a machine learning model, based on a first image of the plurality of images, and for each respective vertex of a plurality of vertices of a bounding volume for the object, first corresponding two-dimensional coordinates of the respective vertex within the first image;
   tracking, from the first image to a second image of the plurality of images, a position of each respective vertex along a plane underlying the bounding volume;
   determining, for each respective vertex, second corresponding two-dimensional coordinates of the respective vertex within the second image based on the position of the respective vertex along the plane and independently of processing of the second image by the machine learning model; and
   determining, for each respective vertex, (i) first corresponding three-dimensional coordinates of the respective vertex, as represented in the first image, based on the first corresponding two-dimensional coordinates and (ii) corresponding second three-dimensional coordinates of the respective vertex, as represented in the second image, based on the second corresponding two-dimensional coordinates.

19. The article of manufacture of claim 18, wherein the operations further comprise:
   determining, by the machine learning model, based on a third image of the plurality of images, and for each respective vertex of the bounding volume, third corresponding two-dimensional coordinates of the respective vertex within the third image;
   determining, for each respective vertex, corresponding intermediate three-dimensional coordinates of the respective vertex based on the third corresponding two-dimensional coordinates; and
   determining, for each respective vertex, corresponding third three-dimensional coordinates of the respective vertex, as represented in the third image, based on an intersection of (i) the bounding volume as defined by the corresponding second three-dimensional coordinates of each respective vertex and (ii) the bounding volume as defined by the corresponding intermediate three-dimensional coordinates of each respective vertex.

20. The article of manufacture of claim 18, wherein the machine learning model is configured to process images at no less than a threshold rate, wherein a frame rate of the video exceeds the threshold rate, and wherein a number of consecutive images for which corresponding two-dimensional coordinates of each respective vertex are determined (i) by tracking the position thereof along the plane underlying the bounding volume and (ii) independently of processing of the consecutive images by the machine learning model is based on a difference between the threshold rate and the frame rate.

* * * * *